May 13, 1958 J. W. FOGWELL ET AL 2,834,166
PACKAGING MACHINE
Filed Aug. 10, 1955 23 Sheets-Sheet 10

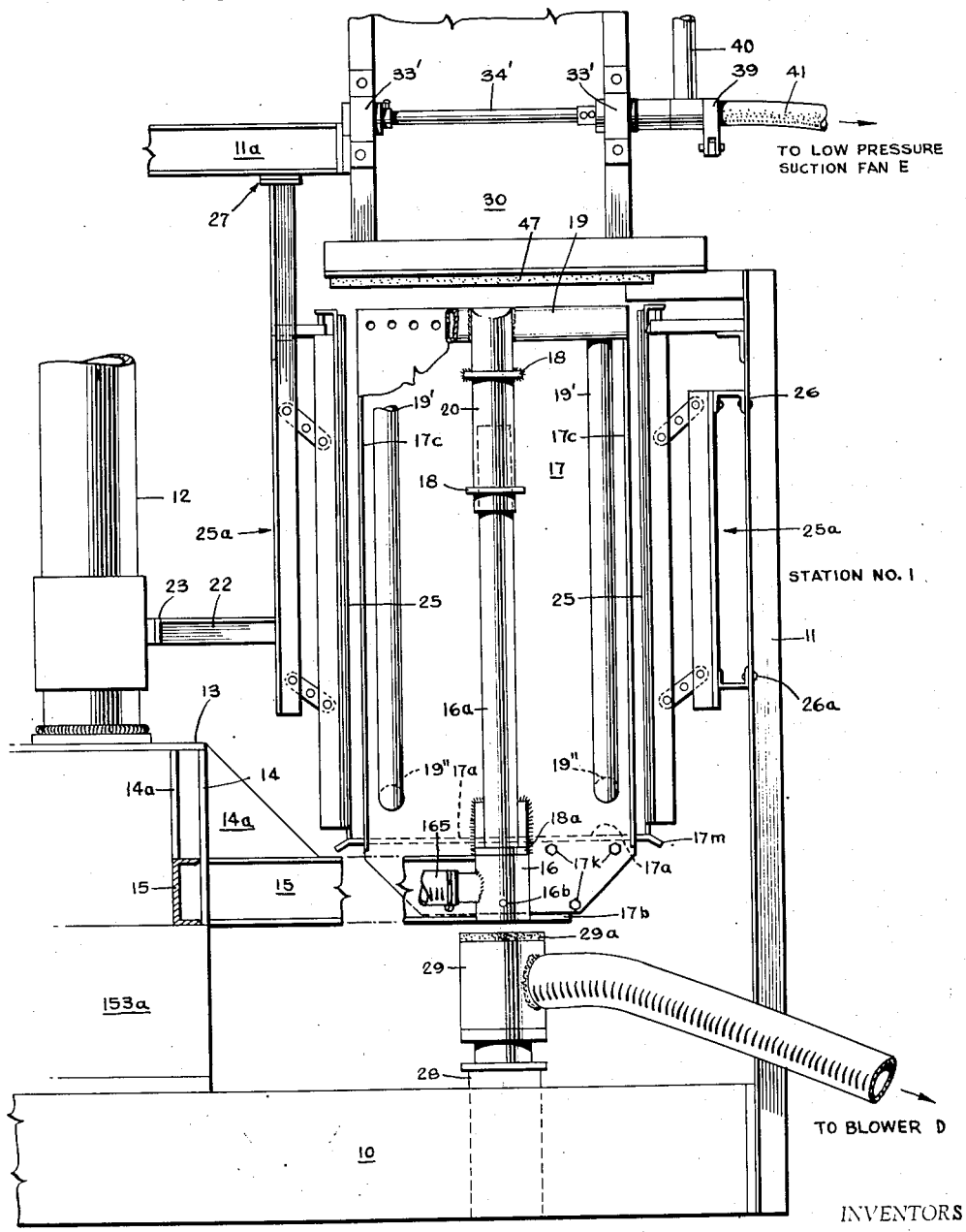

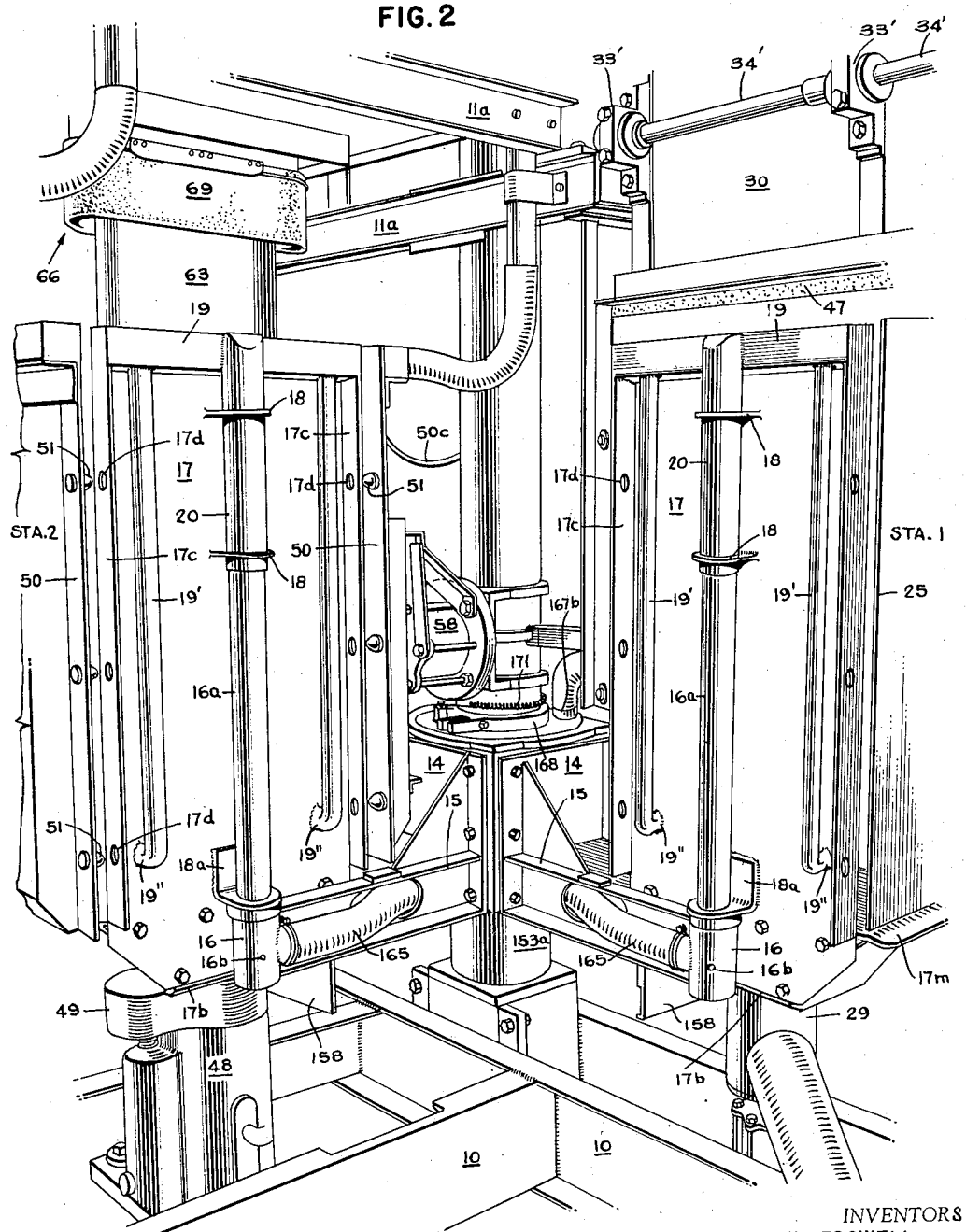

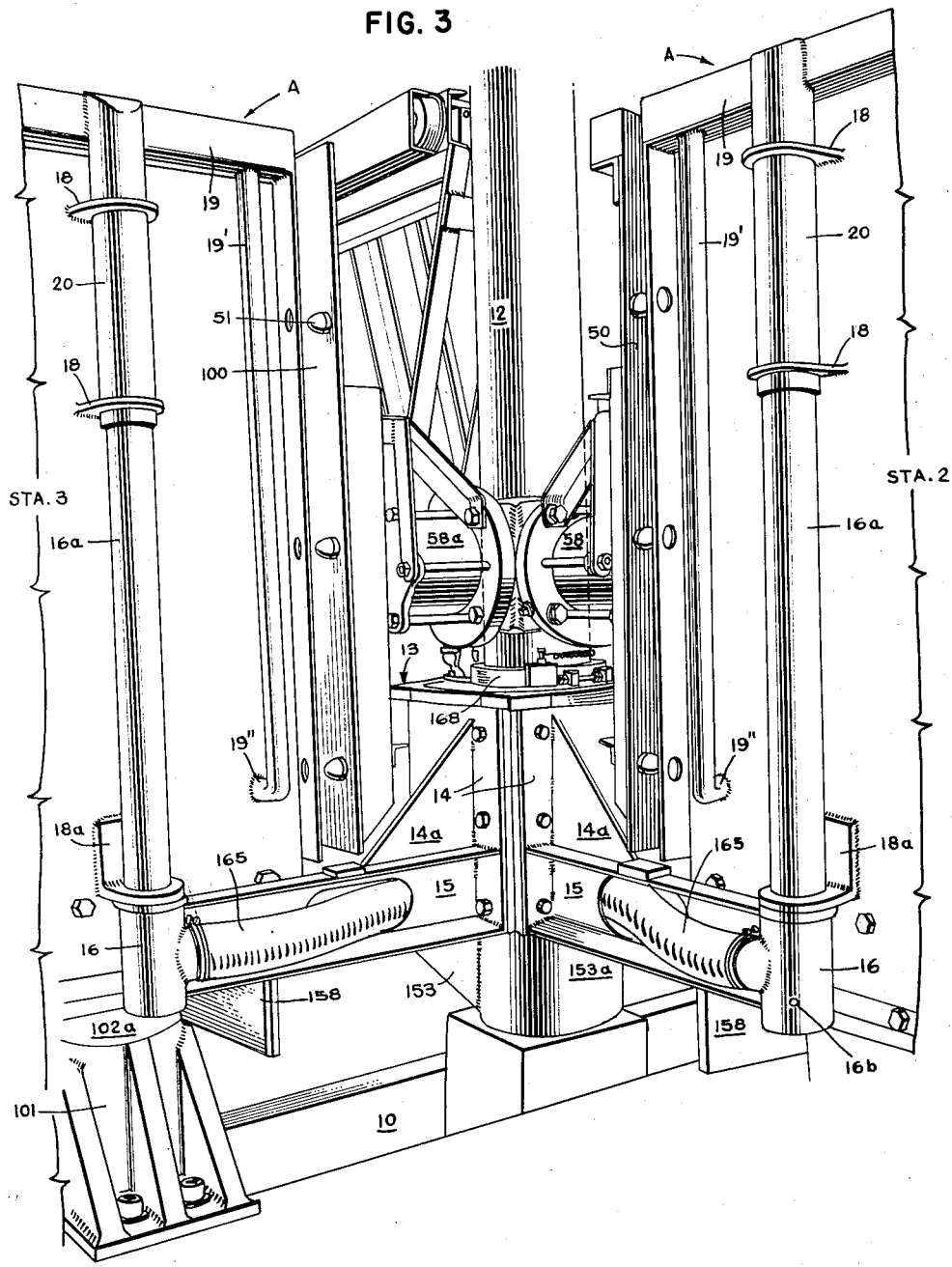

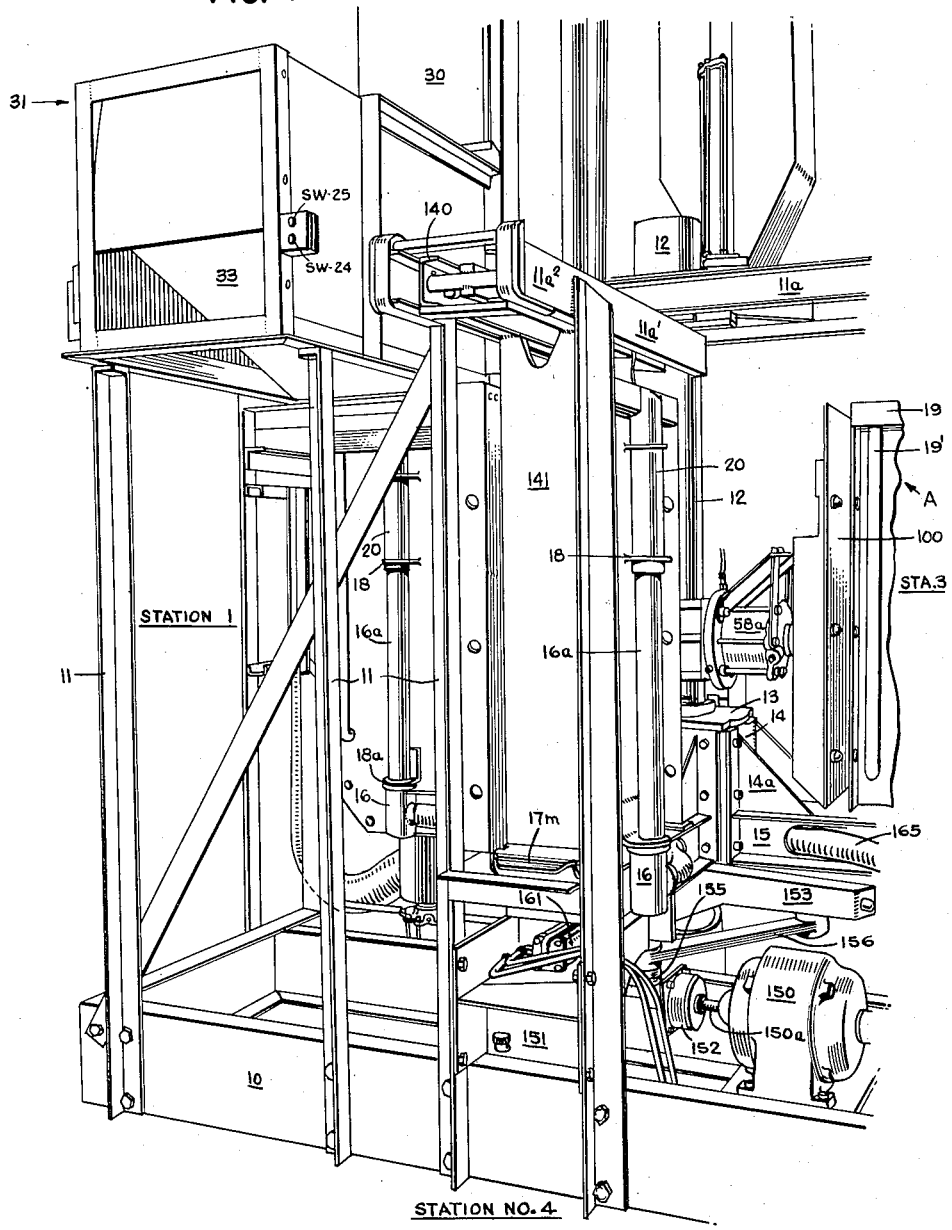

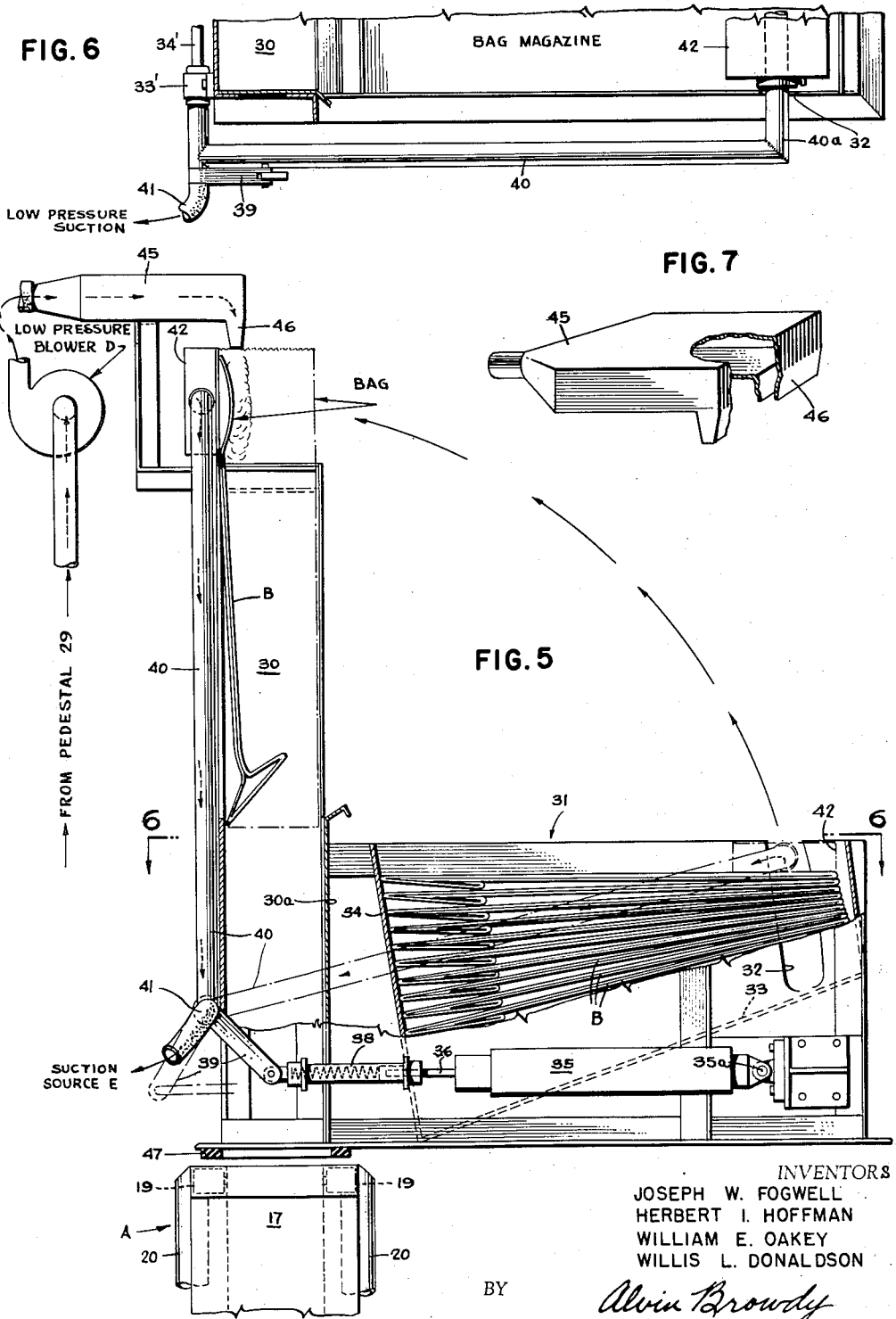

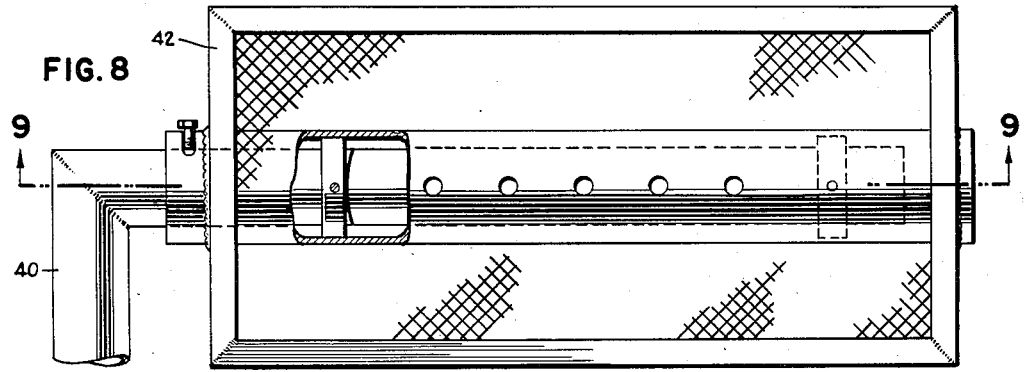
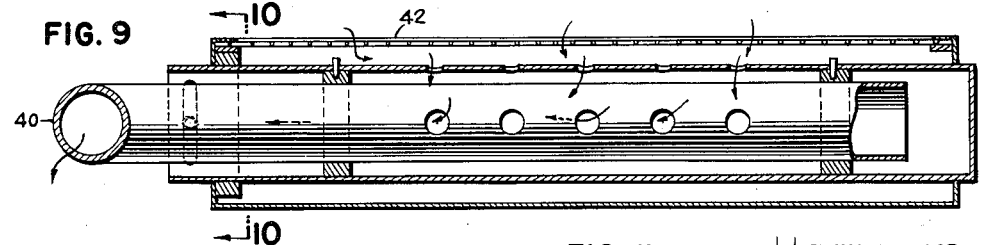
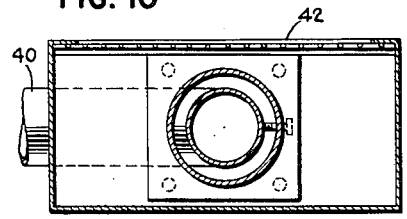
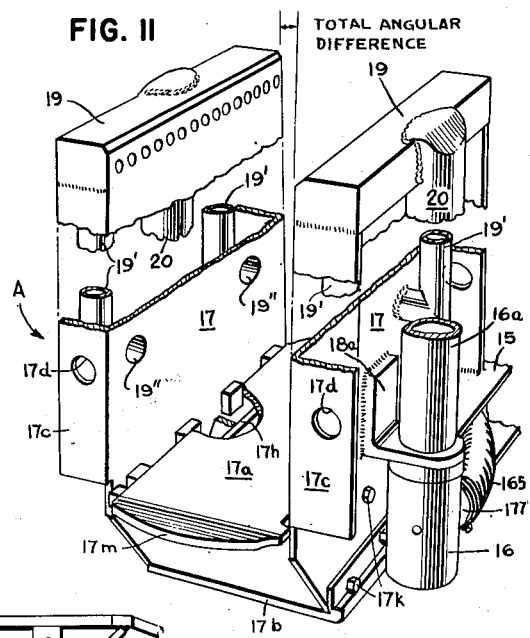
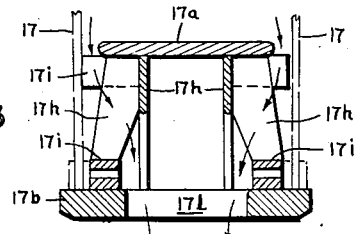
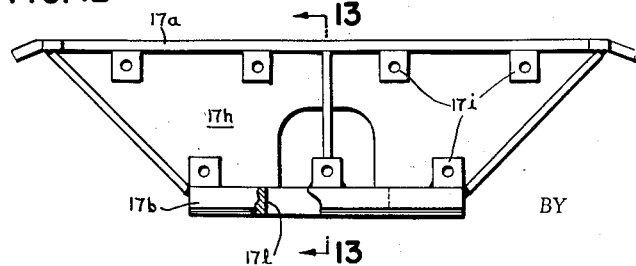

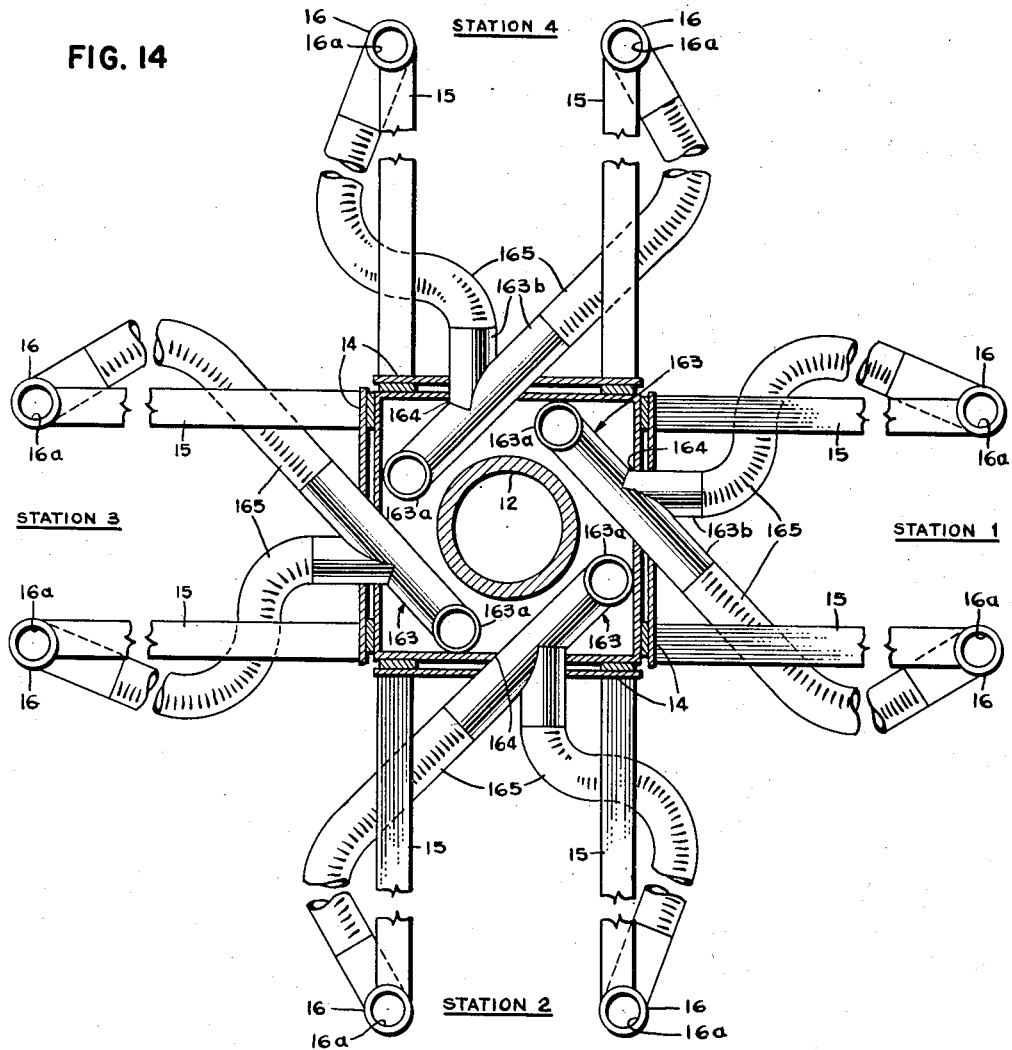

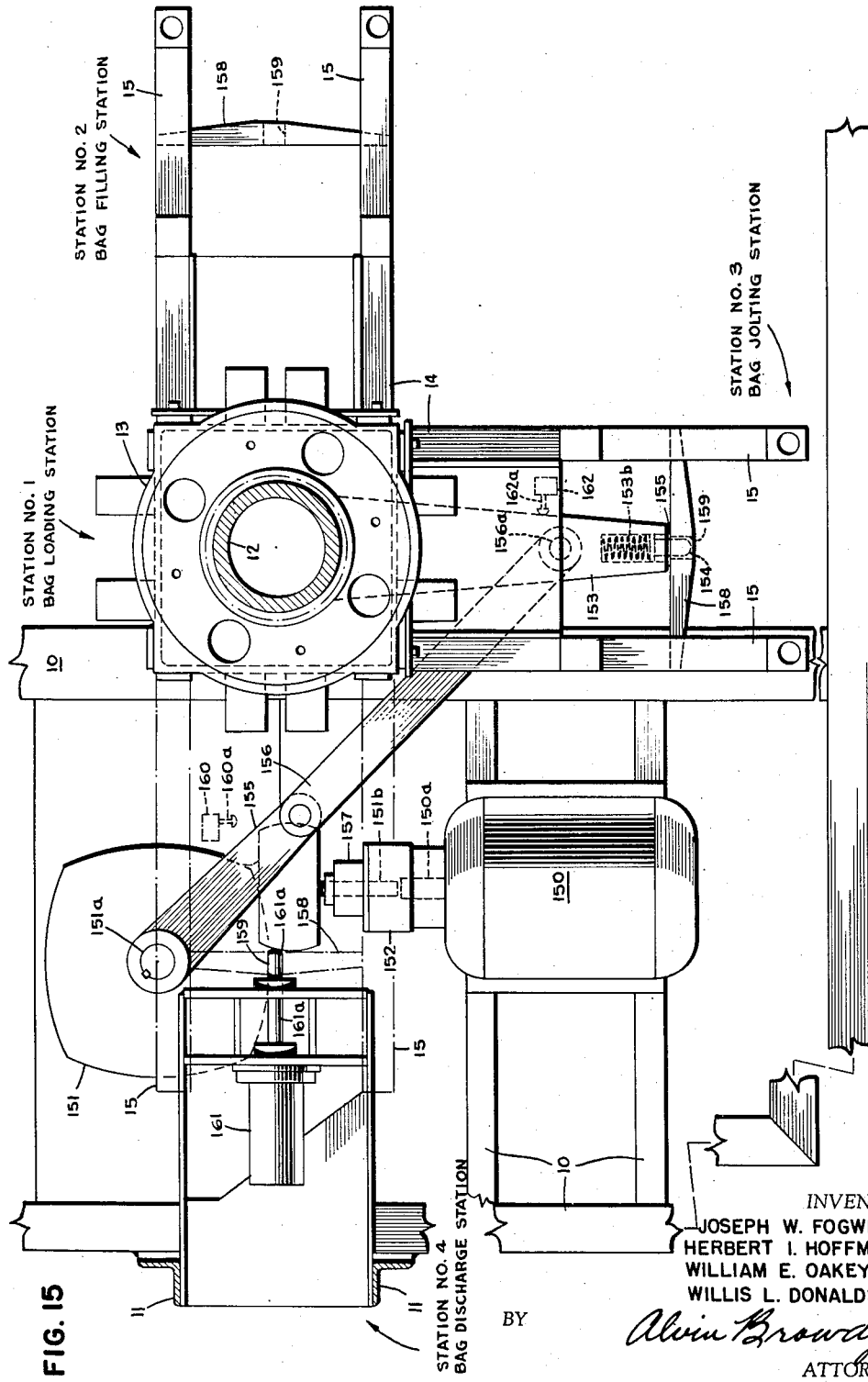

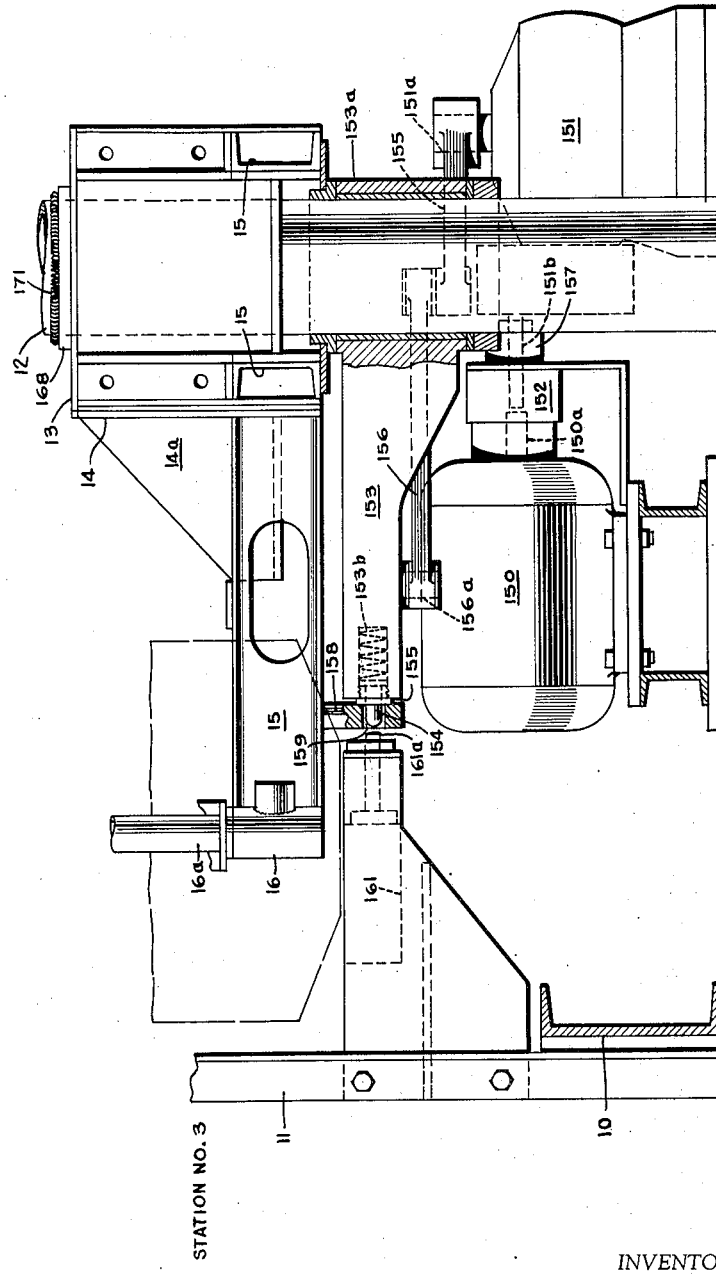

INVENTORS
JOSEPH W. FOGWELL
HERBERT I. HOFFMAN
WILLIAM E. OAKEY
WILLIS L. DONALDSON
BY
Alvin Browdy
ATTORNEY May 13, 1958   J. W. FOGWELL ET AL   2,834,166
PACKAGING MACHINE Filed Aug. 10, 1955   23 Sheets-Sheet 11

INVENTORS
JOSEPH W. FOGWELL
HERBERT I. HOFFMAN
WILLIAM E. OAKEY
WILLIS L. DONALDSON

BY  *Alvin Browdy*
ATTORNEY

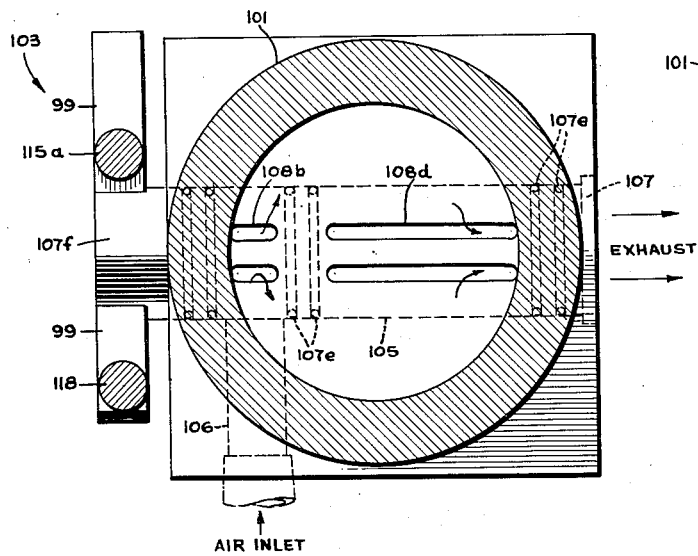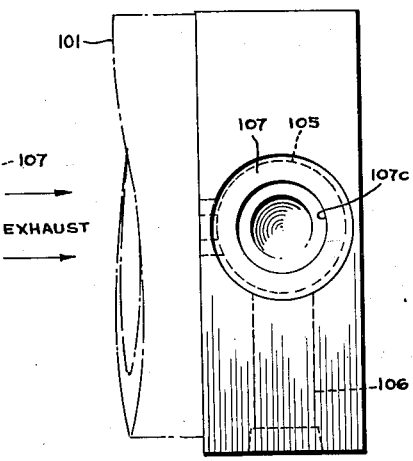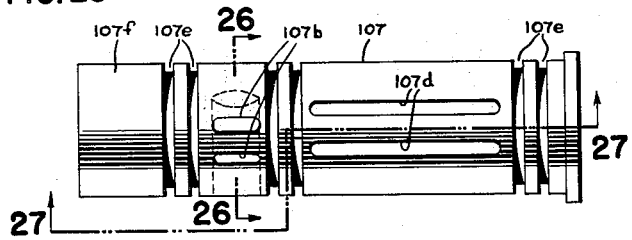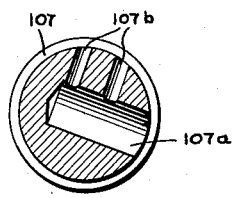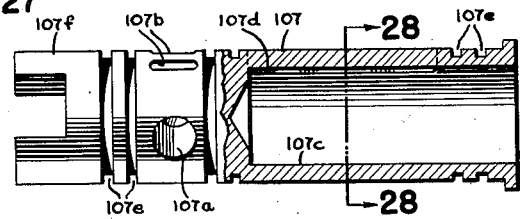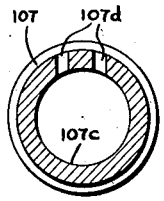

May 13, 1958 J. W. FOGWELL ET AL 2,834,166
PACKAGING MACHINE
Filed Aug. 10, 1955 23 Sheets-Sheet 13
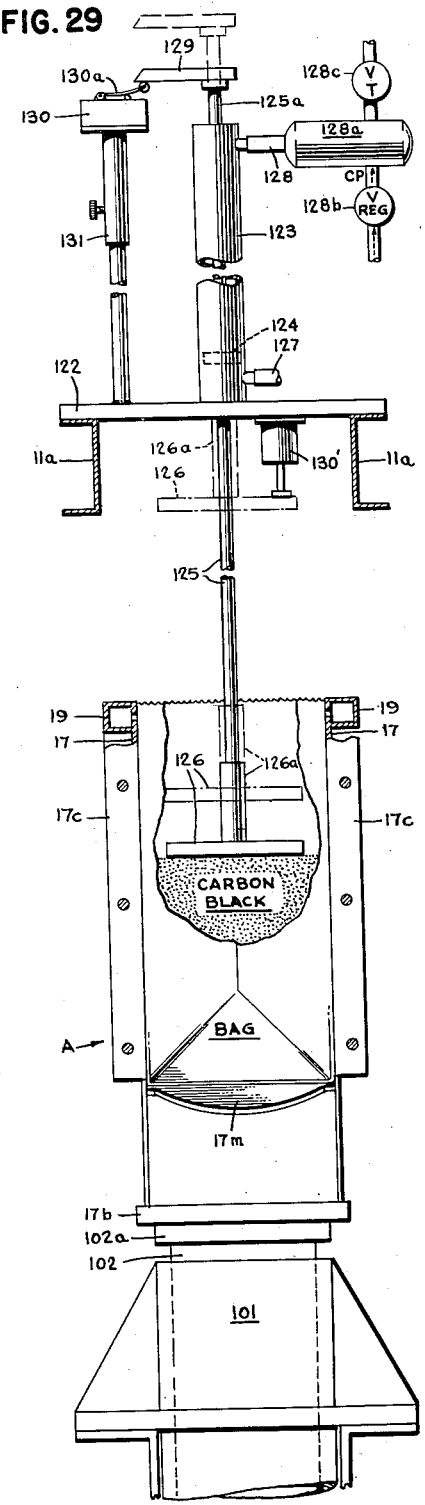
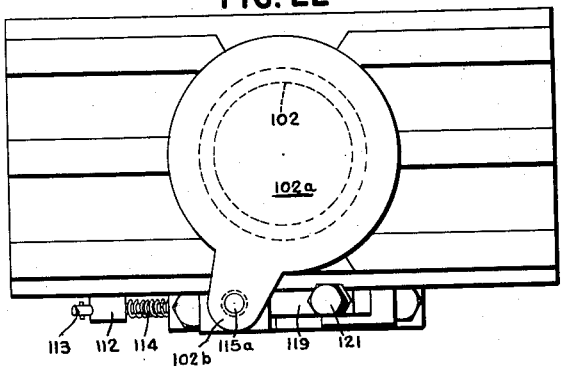
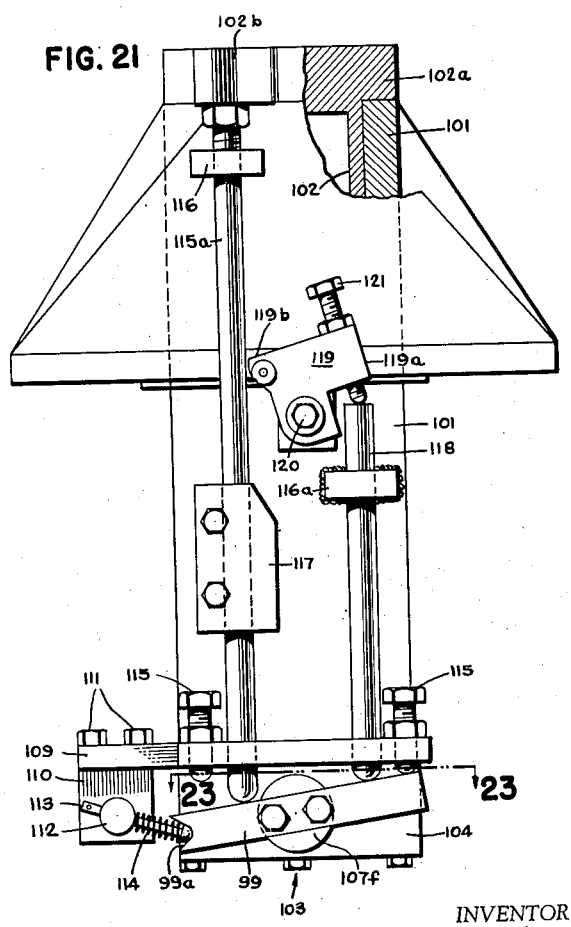
INVENTORS
JOSEPH W. FOGWELL
HERBERT I. HOFFMAN
WILLIAM E. OAKEY
WILLIS L. DONALDSON
BY
Alvin Browdy
ATTORNEY

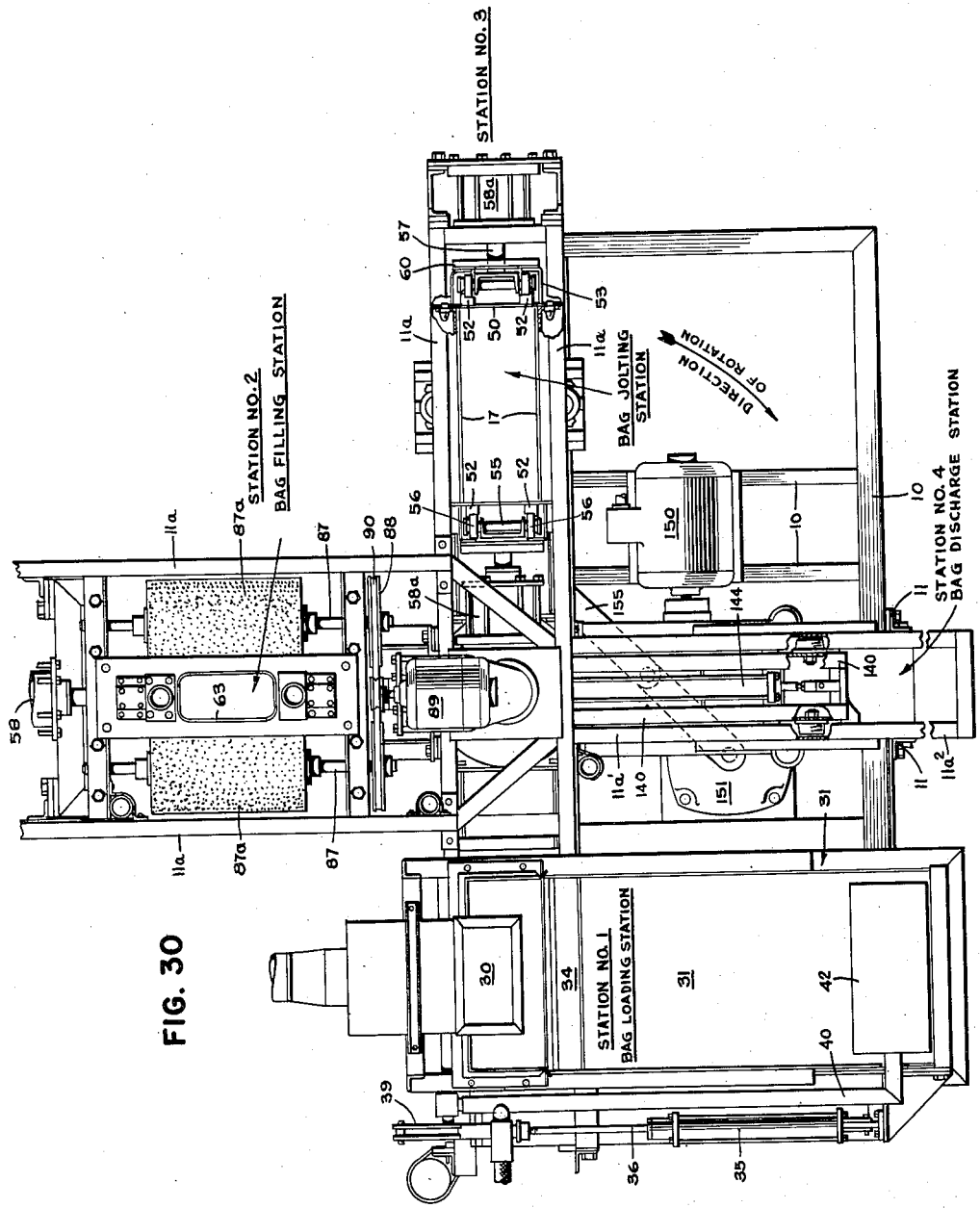

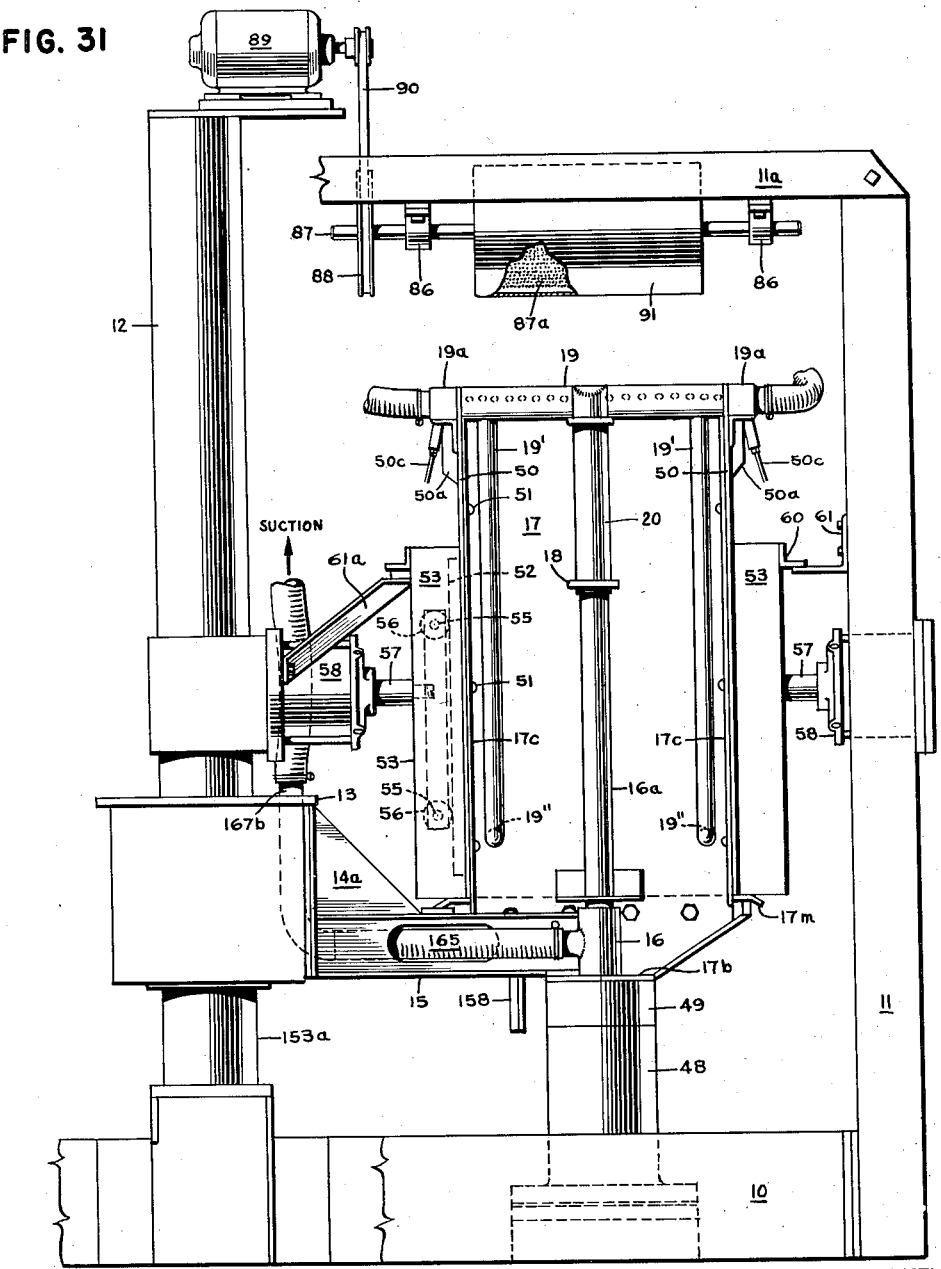

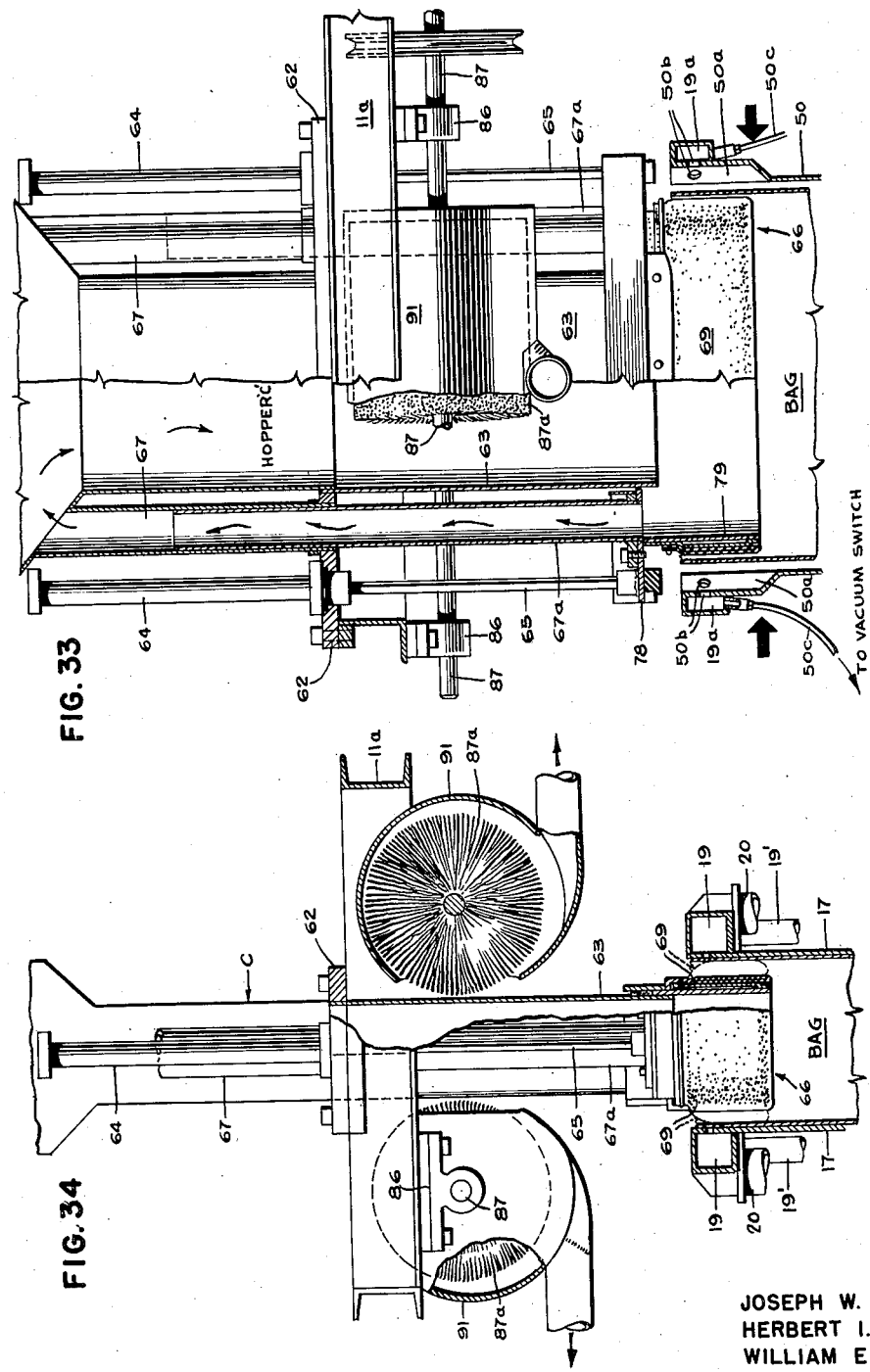

May 13, 1958 J. W. FOGWELL ET AL 2,834,166
PACKAGING MACHINE
Filed Aug. 10, 1955 23 Sheets-Sheet 17

INVENTORS
JOSEPH W. FOGWELL
HERBERT I. HOFFMAN
WILLIAM E. OAKEY
WILLIS L. DONALDSON
BY Alvin Browdy
ATTORNEY May 13, 1958  J. W. FOGWELL ET AL  2,834,166
PACKAGING MACHINE
Filed Aug. 10, 1955
23 Sheets-Sheet 18
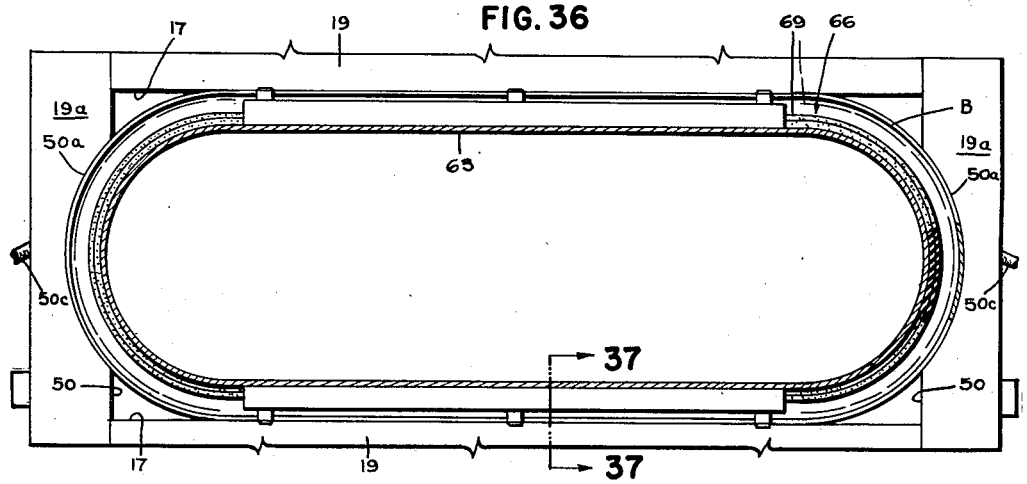
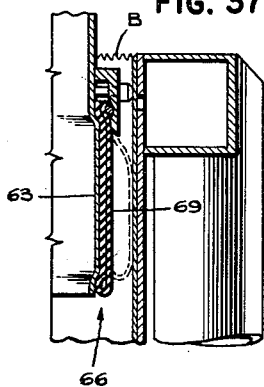
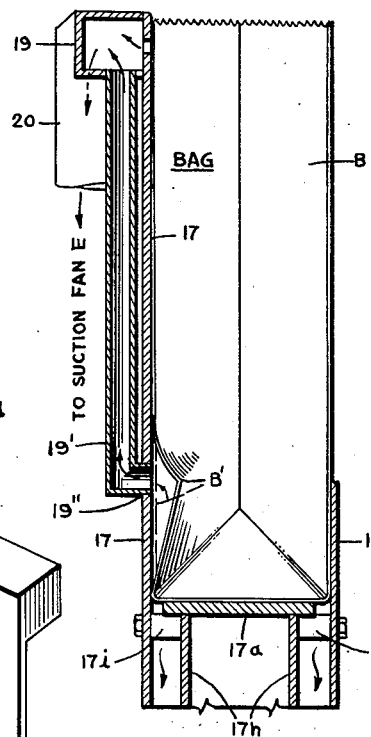
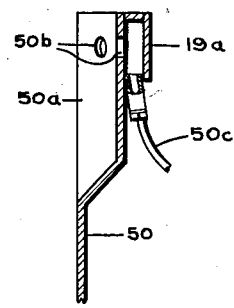
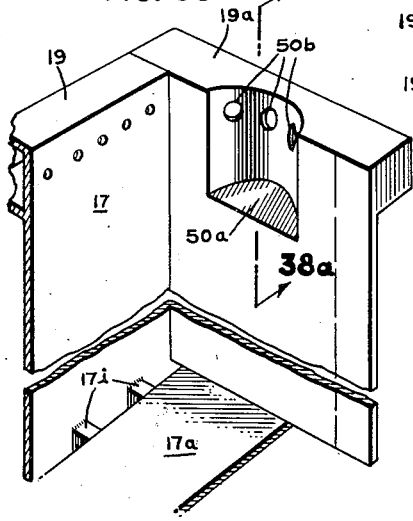
INVENTORS
JOSEPH W. FOGWELL
HERBERT I. HOFFMAN
WILLIAM E. OAKEY
WILLIS L. DONALDSON
BY Alvin Browdy
ATTORNEY May 13, 1958

J. W. FOGWELL ET AL 2,834,166

PACKAGING MACHINE

Filed Aug. 10, 1955

STATION NO. 4

INVENTORS
JOSEPH W. FOGWELL
HERBERT I. HOFFMAN
WILLIAM E. OAKEY
WILLIS L. DONALDSON

BY Alvin Browdy

ATTORNEY

May 13, 1958  J. W. FOGWELL ET AL  2,834,166
PACKAGING MACHINE
Filed Aug. 10, 1955                                      23 Sheets-Sheet 20

FIG. 42

INVENTORS
JOSEPH W. FOGWELL
HERBERT I. HOFFMAN
WILLIAM E. OAKEY
WILLIS L. DONALDSON
BY Alvin Browdy
ATTORNEY May 13, 1958     J. W. FOGWELL ET AL     2,834,166

PACKAGING MACHINE

Filed Aug. 10, 1955                                  23 Sheets-Sheet 21

INVENTORS
JOSEPH W. FOGWELL
HERBERT I. HOFFMAN
WILLIAM E. OAKEY
WILLIS L. DONALDSON

BY *Alvin Browdy*
ATTORNEY

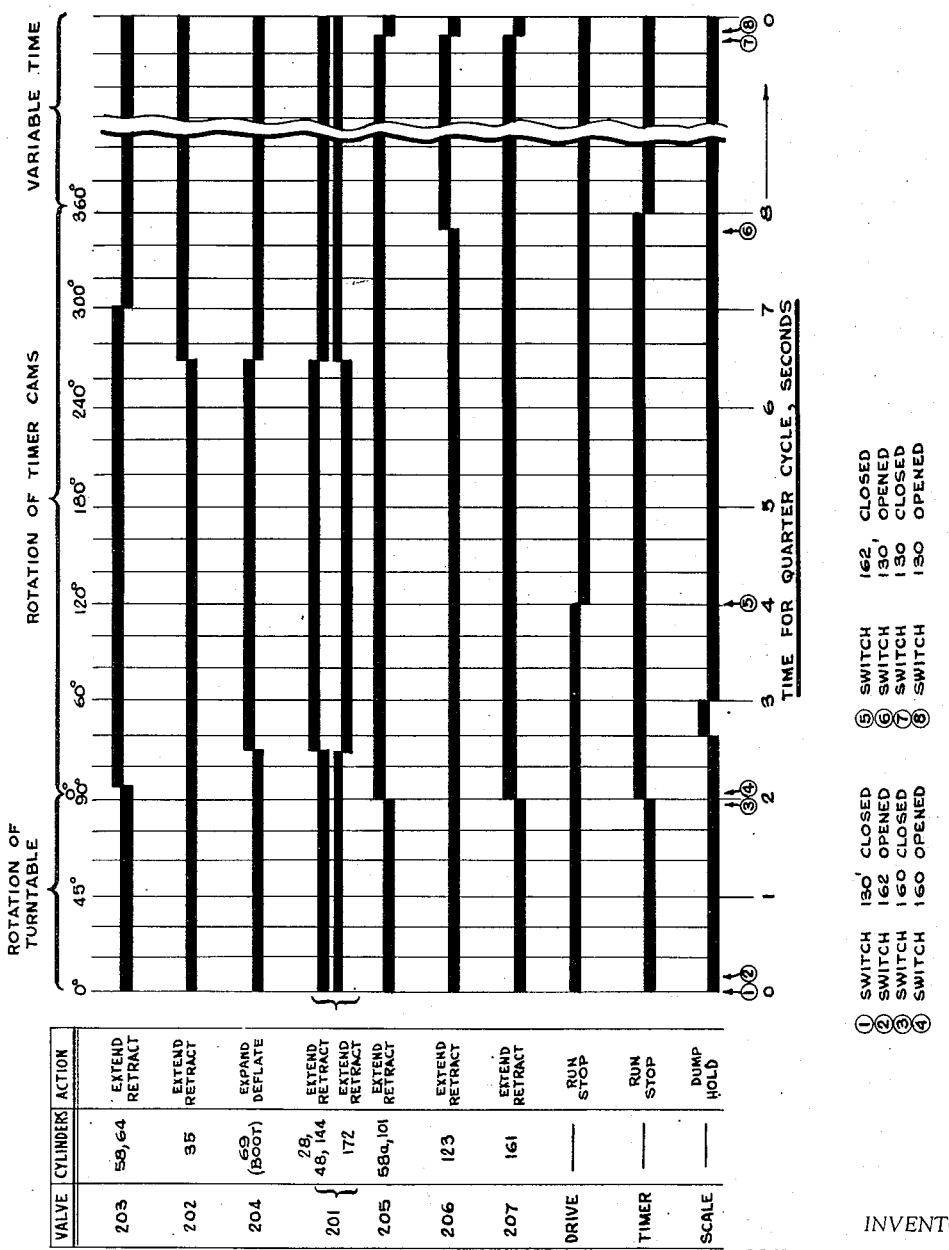

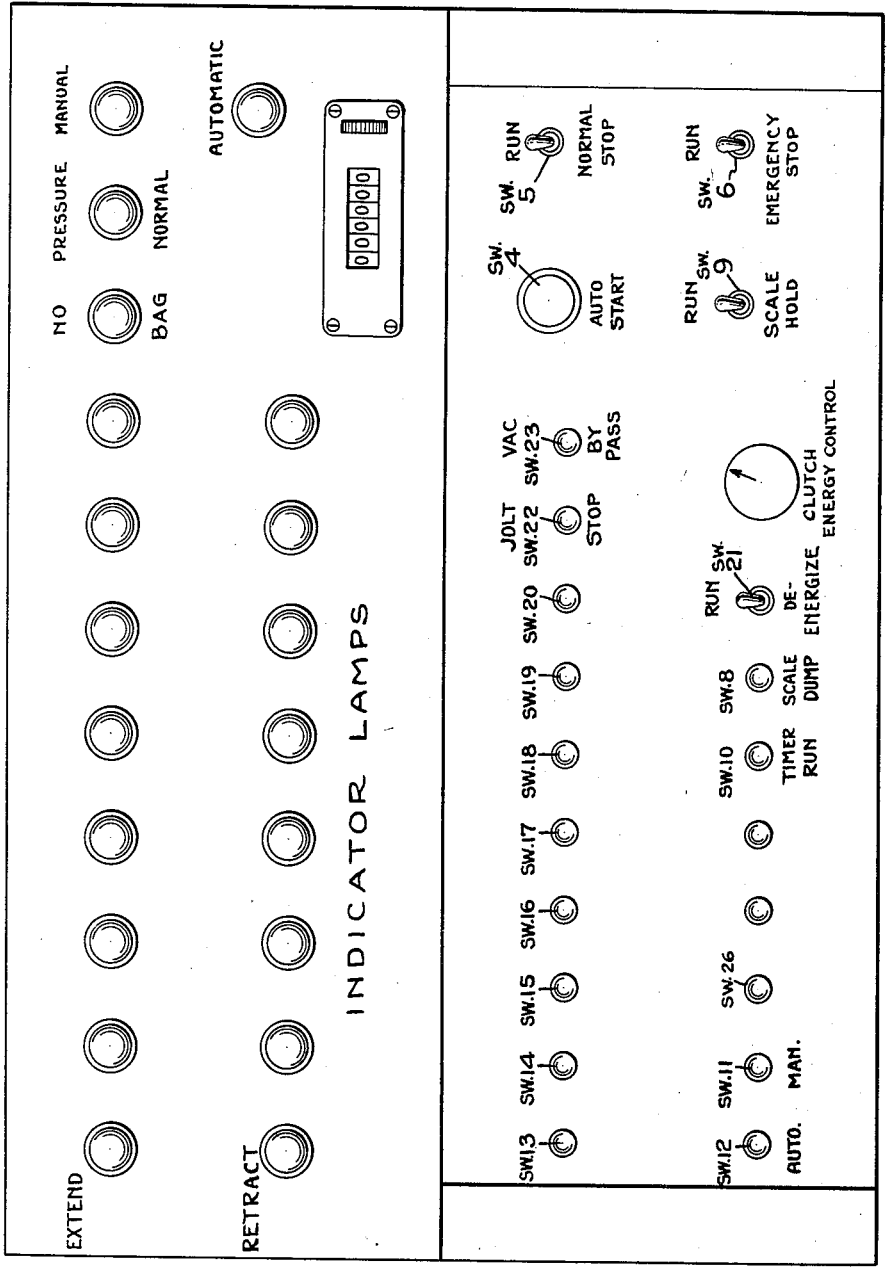

United States Patent Office 2,834,166
Patented May 13, 1958

2,834,166

PACKAGING MACHINE

Joseph W. Fogwell, Herbert I. Hoffman, William E. Oakey, and Willis L. Donaldson, San Antonio, Tex., assignors, by mesne assignments, to Carbon Black Packaging, Inc., Bartlesville, Okla., a corporation of Delaware Application August 10, 1955, Serial No. 527,435

32 Claims. (Cl. 53—59)

The machine of this invention is a bag filling machine and is more particularly designed to fill paper bags with fluent materials having low energy transfer characteristics which are normally highly aerated as they are flowed or dumped into the bag, and which require compaction by jogging and jolting to increase their density in the bag before it is sealed and delivered. Carbon black is one such material, and while the machine has been specifically designed for handling this material in pelletized form, it may be used equally well for other materials having similar physical characteristics.

In the packaging of materials such as carbon black, the size of the bag in which the material is packaged is controlled by many outside factors. Among these are the cost of paper, the size of pallet upon which packaged material is handled, and the width of freight cars and trucks which transfer them. The industry seeks to develop a size of bag which will lend itself well to loading requirements without wasting available space and which will permit of its being filled to capacity with its predetermined charge of material to a height which will permit sealing the bag. The machine of the present invention is designed to handle a bag of predetermined size, the bag being designed to hold a charge of predetermined weight or capacity, with a sufficient portion of the bag above the level of material left therein to permit sealing the bag in machines which tuck in the gussets of the bag, apply adhesive to the inside of the faces of the bag and then fold them in succession, one over the other and apply pressure to effect a seal. This means that in the handling of a material having the characteristics of carbon black, the level of material charged into the bag must be compacted to a depth in the bag which will leave sufficient bag material above the level of the contents, so that said exposed unfilled bag portion is slightly shorter in length than the distance from one face of the bag to the other. This permits folding the open end of the bag without any overlapping of edges, resulting in an economy of bag material. The preliminary jarring at the second, or filling station, of the machine is calculated to lower the level of the initial charge from the scale hopper to a point below the upper edge of the open bag to prevent the spilling of material when the charging spout is removed from the bag. The subsequent jolting at the third station lowers the level of the material in the bag to the desired height so that it may be sealed.

Carbon black is a material with a low energy transfer characteristic and up to this point, no known machine has been developed which is capable of satisfactorily handling the material for packaging purposes.

In a material with a low energy transfer characteristic, wherein a force applied to one side of a loose mass of the material is absorbed before said force is transferred to a significant depth in the material, a vibratory action as produced by a vibrating packer will settle or compact a small portion of the material, and only that portion of the material nearest the source of the vibration. In order to compact the material to a greater depth, it has been found that severe jolting of the material in a rigid container is more effective to carry out the compaction thereof throughout the mass. It has further been found that the individual particles of pelletized material are broken down less with the jolting type of composition than with other types, this preservation of the individual particles being a highly desirable feature in the handling of a material such as pelletized carbon black. In producing such a jolting action care must be taken not to accelerate the container for the material in a downward direction faster than the acceleration of gravity for otherwise the material would not follow the container and would be aerated with each stroke as well as being compacted. Because of the necessity for allowing the material to be accelerated by gravity and because of the severe jolting action necessary, a considerable height of drop is required. This drop height, in the case of carbon black, may be as great as eight inches or more. In order to achieve the desired compaction with as few strokes as possible, it has been found that the container for the material must be dropped upon a rigid base. Such a base may be the heavy steel structure of the machine base which is backed up by a heavy concrete slab. Because of the abrupt deceleration of the container, the material at the bottom of the container may have an acceleration of 100 times that of gravity, or more. This type of jolting action is in direct contrast to the relatively gentle action of the sinusoidal-type of vibrator heretofore used in the compaction of most materials which require compaction.

The principal object of the invention, therefore, is to provide a machine which can pick up an empty folded bag, open it, fill it, compact the contents to the required density and depth in the bag, and then deliver it to a sealing machine.

Another object is to accomplish the foregoing without spilling any of the material being packaged during any of the foregoing steps, so that the machine and its environs, as well as the bag, are kept in a neat and clean condition, and so that the filled bag may be sealed without difficulty. Novel means are provided to seal the opening between a pouring spout and the open mouth of the bag while the material is being poured into the bag.

Another object is to provide a machine of this character which is of the rotary turret type, comprising a central post around which the turret revolves, the turret comprising a plurality of similar, radially extending arms which support a bag carrier, one for each station of the machine, the turret being successively indexed from station to station when the machine is in operation.

Another object is the provision of a novel bag carrier mounted on said radially extending arms, the carrier having side walls and a bottom, with the end walls thereof permanently mounted at each station with the exception of the last, the delivery station, said end walls being so constructed and arranged as to close the ends of the carrier at each of the first three stations at the proper interval as the carrier is successively positioned at each station. Another object is the provision of end walls at certain of said stations which are so mounted as to be capable of reciprocation with the bag carrier during the jogging and jolting cycles of the latter. Still another object is the provision of such a carrier which is removable from its turret support, so that it may, if desired, be replaced by another of a different capacity. The carrier, with its end walls closed, not only supports the bag being filled, but shapes it as well while the material in the bag is being compacted by jogging and jolting.

A further object is the provision of a novel arrangement for creating air suction in said carriers for the purpose of holding the bag open during the bag feeding and filling operations as it moves from the first to the second station.

A further object is the provision of novel means for lifting a single folded bag from a magazine by suction applied to one side of the bag and opening said bag by means of air under pressure simultaneously blown along the other side of the bag.

Still a further object is the provision of a sensing means or feeler gauge at the jolting station to determine when the material in the bag has been jolted to the proper density and depth in the bag.

A particular object of the machine is to provide a long stroke jolt for compacting material with a low energy transfer characteristic, such as carbon black, this long stroke being uniquely effective with such materials.

Other objects are:

To provide an electrical control circuit effecting actuation and synchronization of the moving elements of the machine by energizing and de-energizing various solenoids for controlling the valves.

To provide a control circuit of relatively simple design having a minimum number of electrical components, and incorporating a control panel with indicator means associated with various valve actuating solenoids to indicate valve positions and solenoid energization.

To provide a control circuit which is responsive to the opening and closing of limit switches which are engaged by moving parts of the machine so as to effect complete synchronization of all moving parts.

Further objects will appear during a study of the following specification taken together with the annexed drawings illustrating one practical embodiment of the invention, and in which Figure 1 is a side elevation, with parts in section, of a portion of the machine, at the first station.

Figure 2 is a perspective view of a portion of the machine showing the central supporting column, the rotary turret and a portion of stations 1 and 2.

Figure 3 is a perspective view of a portion of the machine, showing the central supporting column, the rotary turret, and a portion of stations 2 and 3.

Figure 4 is a perspective view of a portion of the machine, looking at station No. 4, but also showing portions of stations 1 and 3.

Figure 5 is a detail, partly in section and partly in elevation, showing the bag magazine at the first station, the bag chute, and the bag pickup arm.

Figure 6 is a partial plan view taken along the line 6—6 of Figure 5, showing the pickup arm in its lowered, or bag lifting position.

Figure 7 is a detail in perspective of the air nozzle which opens the bag and which is positioned above the chute.

Figure 8 is a front elevation, with parts in section, showing the bag pickup suction head.

Figure 9 is a cross section thereof taken along the line 9—9 of Figure 8.

Figure 10 is a cross section thereof along the line 10—10 of Figure 9.

Figure 11 is a perspective view of the bag carrier, with portions broken away and parts shown in section.

Figure 12 is a side elevation of the sub-base of the bag carrier, with the side wall removed.

Figure 13 is a cross section through Figure 12 along the line 13—13.

Figure 14 is a diagrammatic plan view, with parts in section, showing the four stations and part of the pneumatic suction supply means.

Figure 15 is an enlarged plan view of the mechanical drive mechanism for the turret, with parts shown in section.

Figure 16 is a side elevation of a portion of the drive mechanism, looking at a side of station No. 3, and showing the mechanism for locking the turret against rotation, with parts shown in section.

Figure 21 is a side elevation, with parts in section, of the bag jolting mechanism at the third station.

Figure 22 is a plan view thereof.

Figure 23 is a horizontal sectional view, with parts shown in plan view, taken along the line 23—23 of Figure 21, looking in the direction of the arrows, showing the inlet and outlet port arrangement of the valve for the jolting mechanism.

Figure 24 is an elevational detail looking in the direction of the exhaust port of Figure 22.

Figure 25 is an elevation of the valve of the jolting mechanism.

Figure 26 is a sectional view thereof along the inlet ports, taken along the line 26—26 of Figure 25.

Figure 27 is an elevation of the valve, with a portion shown in section, taken along the line 27—27 of Figure 25, with the valve rotated 90°.

Figure 28 is a sectional view of the valve looking in the direction of the arrows along line 28—28 of Figure 27.

Figure 29 is a diagrammatic view of the feeler gauge or sensing mechanism positioned on the machine at the third station.

Figure 30 is a plan view of the machine.

Figure 31 is a side elevation of the machine at the second station as viewed from the right in Figure 30.

Figure 33 is an elevational detail of the structure for the upper portion of station No. 2, showing the bag sealing boot, cleaning brushes and means for evacuating air from the bag carrier.

Figure 34 is an end view thereof.

Figure 36 is a schematic view, partly in section, showing the relationship between the boot, inflated and deflated, with the side walls of the bag carrier unit and the end walls thereof.

Figure 37 is a detail showing a vertical section taken along line 37—37 of Figure 36.

Figure 38 is a perspective detail of a portion of the bag carrier unit in relation to an end wall, the end wall showing an arcuate recess at its upper end.

Figure 38a is a vertical sectional detail taken along line 38a—38a of Figure 38.

Figure 39 is a schematic sectional detail of a bag carrier with a bag held therein in open position, showing how suction is applied to the walls and bottom of the bag.

Figure 42 is a schematic view showing the layout of the solenoid valve and air systems as used in the operation of the machine.

Figure 43 is a diagram of the electrical controls for the machine.

Figure 43a is a diagrammatic illustration of one of the rotary cams which form part of the electrical control circuit, together with a switch actuated by the cam.

Figure 44 is a time sequence chart for one quarter of the cycle of the operation of the machine, the remaining portions of the cycle being identical.

Figure 45 is a representation of a control panel from which the machine is operated, showing operating switch buttons, switches and indicating lights.

Figure 17:
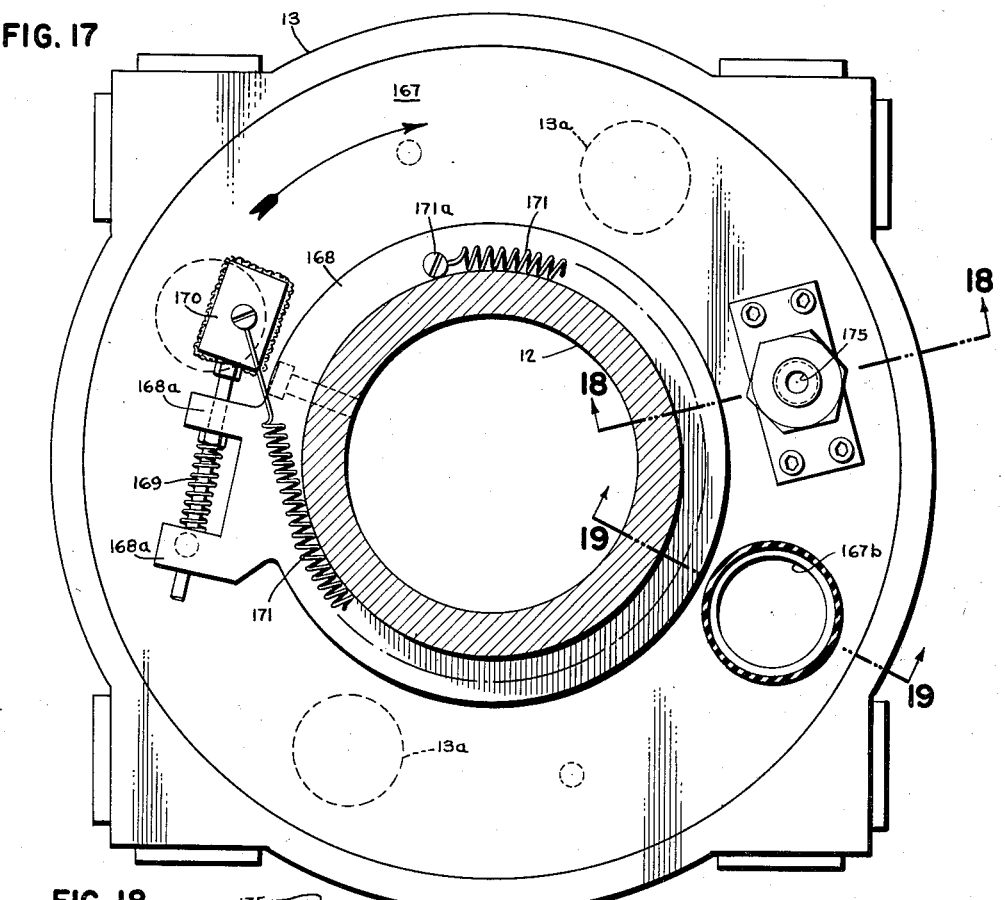
Figure 17 is a plan view of the turret top, with parts shown in section.

The machine is a turret-type machine having four operating stations, Figures 14, 30, 42, namely, (1) a bag pickup and bag opening station, (2) a bag filling and jogging station, (3) a bag jolting station and (4) a bag delivery station, all arranged in the sequential order described, with a bag carrier for each station, the carrier being rotated periodically from station to station when the machine is in operation. While a separate bag jolting station is provided, at the third position as indicated, the bag receives a preliminary jarring or jogging at the filling station during the filling process, as a considerable amount of de-aeration can be accomplished by jogging the bag lightly as it is being filled, and before the bag is completely charged with its load, since the air in the material of the lower portions of the bag does not have to pass through the mass above it as the mass becomes progressively higher in the bag during charging. This preliminary jogging at the second station is necessary to lower the contents of the material in the bag below the open end of the bag. Otherwise the material would flow over the open end of the bag when the spout is removed.

Briefly, in its cycle of operation, the machine lifts a folded bag from a stack in a magazine by suction, moves it to position the folded bag over a chute leading to the first station, blows the bag open in a novel manner and pulls it by suction down the chute to a bag carrier at the first station where the bag is maintained in fully opened position by suction, as will more fully hereinafter appear. From this station the carrier and bag are rotated 90°, while maintained in open position, to station No. 2, where the bag is filled and preliminarily jogged to settle and compact the contents. The filled bag is then rotated 90° further in its carrier to a jolting station where the bag is severely jolted to further compact its contents to the required density. At this station a sensing device is used to determine whether the material has been compacted to the required density and height in the bag. A final 90° rotation subsequently brings the bag and compacted contents to a discharge station where the open bag is bodily discharged from the machine for sealing and further handling as necessary. While only four stations are disclosed, the number may be increased as desire or need dictates, all in accordance with the present invention. In the description of this invention, the structure of the machine and the operative relationship of the parts will first be outlined and then the operation and functions will be described, except at such points where structure and function may be expediently combined without breaking the continuity of the description.

The invention comprises a base 10 (Figures 1, 2, 3, 4) upon which a framework 11 and a superstructure 11a are erected. Substantially centrally of the base, a fixed cylindrical column 12 is erected in a vertical position. A four-sided turn-table 13 is mounted for rotation or indexing in a clockwise direction about this column at the base thereof, under the action of the driving mechanism. A bracket 14 is suitably secured on each side of the turn-table and each bracket has a pair of spaced arms 15, best shown in Figure 14, extending radially outwardly of the column, each pair being spaced 90° from one another. Reinforcing members 14a connect the arms to said bracket. To the free end of each arm 15 a hollow boss 16 is secured by welding or otherwise.

The machine embodies four stations at which its various functions are performed, and in a position of rest, each pair of arms 15 defines a position at a station. Each station is occupied by a bag carrier supported on said arms 15, but as the function of the machine varies at the respective stations each will be described in greater detail. The bag carriers, Figure 11, are all similar and each comprises a substantially U-shaped unit A having side walls 17 and a base 17a. These side walls converge slightly towards the base so that the distance between the walls at the upper edge thereof is greater than that at the base. The bottom 17a rests upon a sub-base erected upon plate 17b and upon a framework of cross-bracing and stiffeners, generally indicated by 17h, Figures 12 and 13, which are welded together. A series of spaced, internally threaded lugs 17i are welded to the underside of plate 17a and to the upper surface of 17b. The side walls 17 have holes arranged to correspond with the threaded sockets of said lugs and bolts 17k secure said side walls to said lugs.

The side edges of said bottom 17a are spaced from the side walls 17 to provide an air passage along said side walls and around said bottom as shown in Figures 11 and 13. The lower plate 17b has a central opening 17—1 which forms a passage through which air is drawn from the carrier by suction. The outer faces of the side walls 17 of each carrier unit, Figures 1–4, carry spaced cleats 18 permanently secured thereto along the upper portion thereof, and another one 18a is positioned at the lower end thereof. An air manifold 19 is fixed at the upper edge of the wall 17 and an air conduit 20 communicates with said manifold and extends downwardly therefrom through holes provided therefor in the cleats 18, the air conduit being welded to the manifold 19 to lead air therefrom.

Tubes 19' are extensions of the manifolds 19 to apply suction to the sides of the bag near the bottom flap thereof to pull it open and to help maintain it in open condition until a charge of material is dumped into it.

The bags which will be filled by this machine are self opening sacks, known as S. O. S. in the trade. This is a gusseted bag with a bottom which, in the folded condition of the bag, is folded over so as to lie adjacent one side thereof. The tubes 19' on the carrier unit extend into the side walls 17 of the unit at a point 19" which lies adjacent that part of the side wall of the bag which is creased along the fold line where the bottom folds up. The function of the tubes 19', therefore, is to apply suction along that creased line to pull that wall of the bag against the wall 17 of the carrier. See Figures 11 and 39.

A tubular extension 16a of the boss 16 extends vertically out of said boss and is telescopically engaged with said air conduit 20. The extension 16a is secured in said boss by a set screw 16b. It will thus be seen that each unit A rests on the boss 16 with the weight thereof carried by the cleats 18a and the unit is slidable vertically as a unit on said tubular extension 16a. By rotating the turn-table a 45° turn, to repair or change the unit A, it may be moved laterally out of position from its overhanging superstructure and then may be bodily lifted vertically from its supports 16 and from its position between the tubular extensions 16a, the air conduit 20 and cleat 18a sliding off the tube 16a.

As thus far described, these units A, of which there are four, one for each station, have only side walls and a bottom, and are movable from one station to another in succession throughout the cycle of operation of the machine. Each unit however, with the exception of the unit at the bag discharge station, also has a pair of end walls which are mounted permanently at their respective stations, do not index with the units and are supported independently of them.

THE BAG OPENING STATION

At the first and bag opening station, Figure 1, these end walls comprise plates 25 which are positioned on opposite ends of the unit A and are supported for swinging movement towards or away from the unit A by means of a four bar linkage 25a, suitably secured to the frame of the machine, the front end wall being supported by the frame at points 26—26a, and the rear end wall at 27, the latter wall being additionally braced by means of an arm 22 fixed to a bracket 23 carried by the central column 12 of the machine.

A jack 28 is supported below the base of the unit A and said base is supported by the arms 15 just above the hollow pedestal 29 of said jack. The pedestal is open at its top and is provided around its rim with a sealing gasket 29a. The open top of this pedestal is in communication with the opening 17—1 of the plate 17b, Figures 12 and 13.

A chute 30, Figures 1 and 5, is positioned vertically directly over the carrier unit A at the first station, and extending horizontally from the chute at its lower portion, but above the unit A, is a bag magazine 31. The magazine is a box-like structure with an open top and a slot 32 formed in the outer side wall thereof. The bottom 33 of the magazine and the rear wall 34 are angularly arranged as shown to support the bags so that the bottom edge of the uppermost bag is always supported against the rear wall 34. This arrangement of the magazine structure is necessary because of the bag construction. Where a bag, B, is in its folded condition, the lower portion of the bag is substantially thicker than the upper portion because of the fact that the bottom thereof is folded over the side walls, as shown in Figure 5. By arranging the bottom 33 and rear wall 34 of the magazine angularly as shown, the uppermost bag is always in a position where it can be picked up by the swiveling pickup head 42, at substantially the same relative position with respect to its open end on each bag. This is necessary to prevent the bag from being knocked off the suction head 42 by the nozzle 46 as the suction head swings to its vertical position.

A pair of bearings 33' are permanently secured to the frame of the chute 30, and a shaft 34' is rotatably supported in these bearings, the shaft extending beyond the outer side of the machine, Figure 1. An air cylinder 35, Figure 5, is suitably pivotally secured at 35a to the frame of the machine along the side of the magazine and a piston rod 36 extends from said cylinder. The rod 36 is connected to an overtravel mechanism 38, which will be more fully described. The overtravel mechanism 38 is connected to a radially extending arm 39 which is keyed to the projecting end portion of the shaft 34', Figure 1. A pick-up arm 40, Figures 5 and 6, is likewise keyed to the end portion of the shaft 34', this arm being a hollow conduit having an air outlet 41 which is in communication with low pressure suction fan E. The free end of said arm 40 supports a pivoted suction head 42 which extends laterally of the arm so as to be positioned directly over the magazine 31, the suction head being connected to the said arm by a short extension 40a, Figure 6, which is adapted to pass into the slot 32 as the arm swings vertically during its bag feeding function, as will further be more fully described in the operation of the machine.

The portion of the chute 30 above the magazine and which faces the magazine is open, and an air manifold 45 having an elongated nozzle 46, Figure 7, is positioned above the chute 30 a distance sufficient to accommodate the suction head 42 between it and the chute when the arm 40 is raised to its vertical position as shown in Figure 5.

The lower peripheral edge of the chute is provided with a sealing gasket 47 which is adapted to seal the opening between the bag carrier unit A and the chute when the unit A is brought into sealing engagement with the chute as will further be described. We now move to a description of station No. 2, the bag filling station.

THE BAG FILLING STATION

Substantially centrally disposed beneath the bag filling station, an air jogging cylinder 48, Figure 2, is provided, the sub-base 17a of the unit A at this station resting on the movable head 49 of the said cylinder. The purpose of the jogging cylinder is to compact the material being packaged as it is poured and to de-aerate said contents as much as possible before it is passed to the next station. More deaeration can be accomplished effectively while the bag is being filled rather than after the bag has been loaded with its full charge of material.

The unit A at this station is similar to that described in connection with the one at the preceding station, but the end walls 50 are different in several respects. The side walls 17 of the unit A have outwardly projecting flanges 17c at each side edge thereof, these flanges being provided with holes 17d spaced along the length of each flange. The end walls which, in the rest position at this station, are spaced from the unit A, are provided with projecting tapered pins 51 which are arranged to coincide substantially with the openings 17d, but are not in strict alignment therewith because of the slightly tapered cross section afforded by the U-shape of the unit A, the legs of the U being further apart at the top than at the base, as previously described in connection with Figure 11. The major diameter of the pins 51 is coextensive with that of the holes 17d, but the pins are arranged on the end wall 50 in substantially a straight vertical line, as will be seen in Figures 2 and 3. The axis of the holes 17d, therefore, is slightly offset outwardly with respect to the axis of the pins, along the upper half of the unit A, to a progressive degree, so that when the end wall 50 is moved against the flanges 17c, the tapered portions of the pins enter these holes and tend to pull the side walls 17 into substantially parallel positions as the flanges move along the tapered portion of the pins until they reach the major diameter thereof. Therefore, when the end walls 50 are closed against the side walls 17, the latter are pulled into substantially vertical position to confine a bag for filling purposes. The tubes 16a are sufficiently flexible to permit such movement. When the end walls are opened again prior to moving the carrier to the next station the side walls 17 will revert to their angular position, which is a decided advantage when the filled bags are discharged from the machine at the fourth station.

At station 2 each end wall 50 (Figures 30, 31, 32) has a pair of spaced trackways 52 permanently secured to its outer face. A channel member 53 encloses this trackway and has its flanges permanently secured to the outer face of the end wall. Between the web 53a of the channel and said outer face a movable carriage is arranged to ride on said trackway. The carriage comprises a channel shaped member 54 having a short axle 55 extending through its side flanges at the upper and lower portions thereof, Figure 31. Rollers 56 are fitted to the free ends of these stub axles, and these rollers are adapted to ride on the trackway 52. The channel member 53 has a longitudinal slot 59 cut in the web thereof to accommodate the piston rod 57. The entire carriage is supported at the free end of the piston rod 57 of an air cylinder 58 which is permanently secured to the frame of the machine. The space between the track 52 and the inner wall 53a of the channel 53 is slightly greater than the diameter of the rollers 56 to provide a slight clearance. The inner wall 53a provides a rear track for these rollers when the cylinders 58 are actuated to open the end walls 50. When the machine is in operation and jogging at this station, the carriage remains stationary and the end walls 50 with tracks 52 reciprocate vertically, supported by the rollers 56, thus giving dynamic support to the end walls during their reciprocation, as will more fully hereinafter appear.

Figure 32:
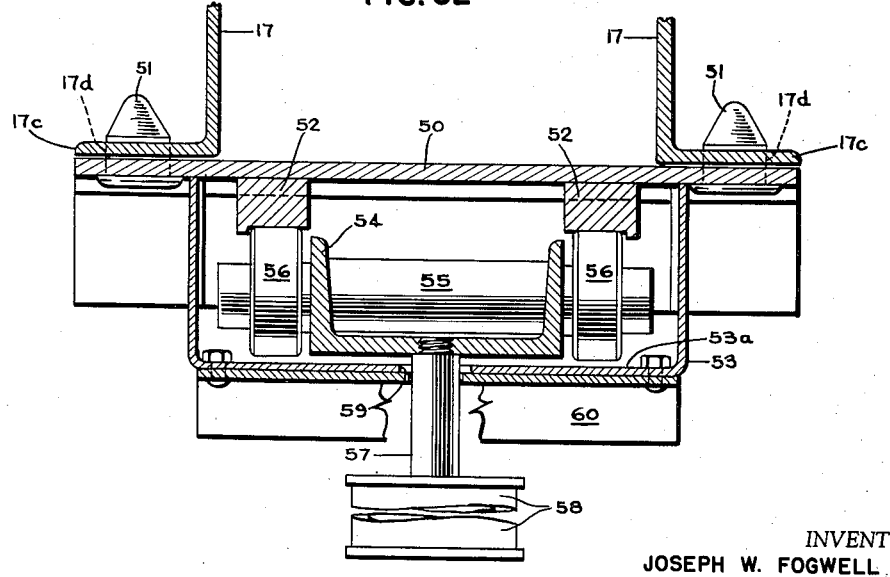
Figure 32 is an enlarged sectional detail in plan view of the carriage and trackway construction for the bag carrier end walls at stations 2 and 3.
Figure 35:
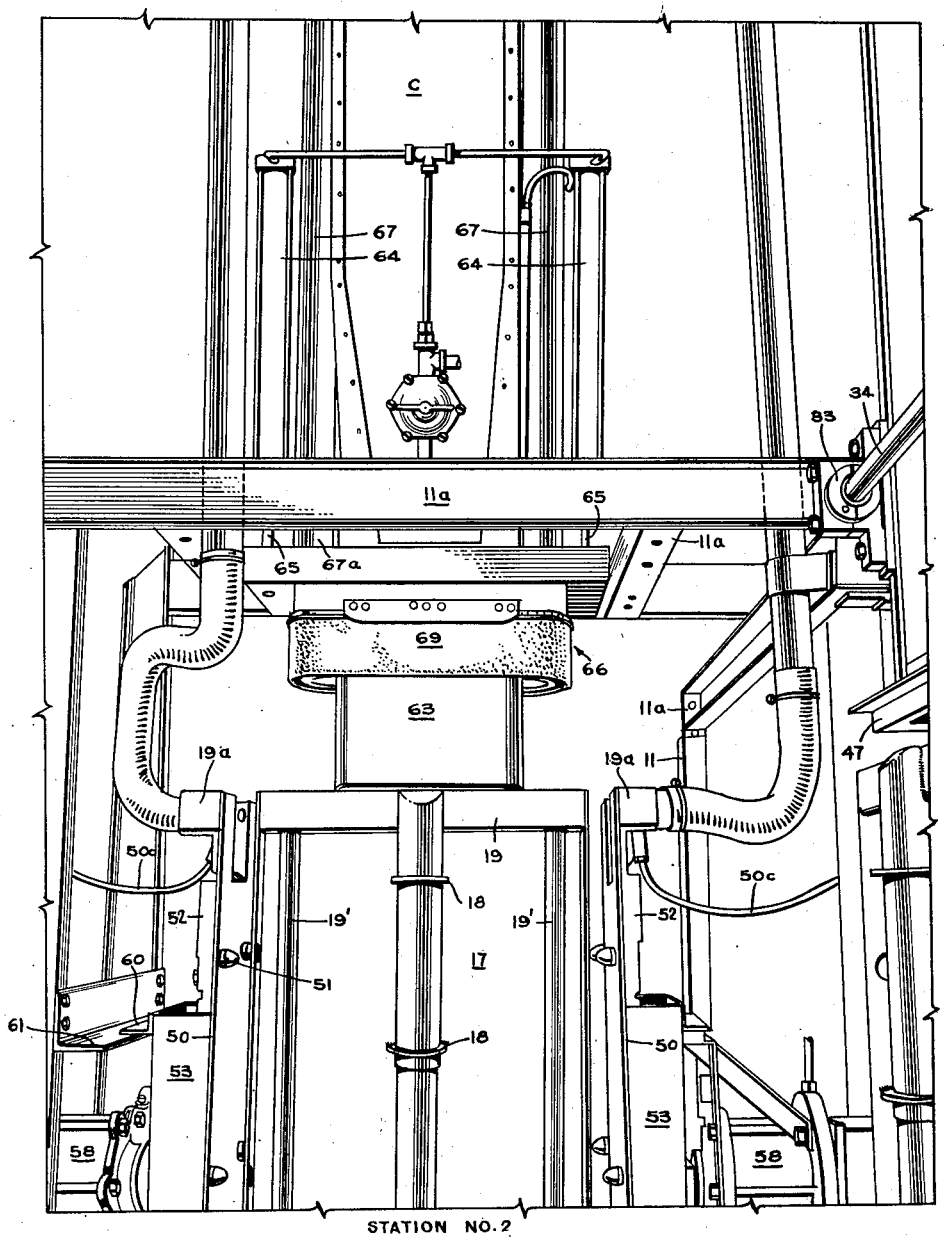
Figure 35 is a partial perspective view of an upper portion of the machine at the second station with the cleaning brushes removed.

An angle 60, Figure 32, is horizontally and permanently secured by welding or otherwise to the upper edge of the back of channel 53, and the weight of one entire end wall 50 and its assembly, including the trackway in rest position, is supported by said angle 60, resting upon another angle 61 suitably secured to the framework of the machine, as shown in Figure 31. The other end wall is suitably suported from a bracket 61a mounted on the central column 12.

Supported by the superstructure 11a of the machine above the carrier unit A at station No. 2 (Figures 33, 34) a plate 62 is mounted to support a spout member 63, which is welded thereto, the spout extending downwardly and terminating above the open mouth of the carrier unit just short of the upper edge of the walls thereof. An air cylinder 64 is mounted on said plate on each side of the spout, the piston rod 65 of each cylinder extending downwardly and supporting a movable boothead assembly 66 which encircles said spout. Disposed adjacent each air cylinder is an air vent conduit 67 which projects through an opening in the plate 62 and is permanently affixed thereto. The boothead assembly 66 includes the plate 78, skirt 79, tubes 67a and boot 69. The lower ends of the piston rods 65 are permanently secured to the plate 78 and this plate has a centrally located opening corresponding in size to that of the spout 63 which extends into said opening for a short distance, as seen in Figure 33. The skirt 79 is welded to the plate 78 and extends downwardly, the boot 69 being supported on this skirt. When the cylinders 64, which are double acting, are actuated by air under pressure, the boothead assembly is raised and lowered around the spout 63. As an extension of the air vent 67, the tubes 67a, which extend upwardly a considerable distance into the vents 67 and are telescopic therewith, are permanently fixed at their lower ends to the boothead 66 which is perforated at those points to allow the tube extension 67a to communicate with the atmosphere adjacent the mouth of the spout within the paper bag as it is being filled and while it is being jogged at this station. The tubes 67, 67a form a dust chimney by means of which the dust raised in the bag B when a charge is dumped into it, is carried upwards and returned to the hopper C so that there can be no loss in the weighed charge.

A hopper C, from which the material to be packaged is dicharged into the spout 63, is supported over the spout 63 between the air vents 67, and is suitably secured to the plate 62.

The upper ends of the air vents 67 lead into the walls of the hopper C, so that the dust raised when a charge of material is released into the bag supported below the hopper, is led upwardly into the hopper and carried back downwardly into the bag. Since a weighed charge is dumped into the bag and it is desired to keep this weight accurate, it is highly desirable that the dust raised during charging be returned to the bag in this fashion to prevent loss of weight.

Suitable air feed and exhaust lines (not shown) are supplied so as to feed and exhaust air into and from the inflatable boot. Said boothead embodies an inflatable member 69, the construction and arrangement of which is substantially disclosed in the patent to Richardson, No. 2,178,494 and therefore will not be detailed here. The function of said boot is to close the open end of a paper bag when the boot is lowered into the bag during the bag filling operation. This is accomplished by inflating the boot through said air feed lines so as to expand said boot against the bag walls and seal the latter against the side walls of the carrier unit A, as well as against the end walls 50. The boot 69 itself has parallel side walls and semi-circular ends and therefore would not seal a bag which is rectangular in plan view when open. To meet this contingency the end walls 50 at their upper edges are provided with a centrally located arcuate recess 50a which is provided with openings 50b communicating with manifold 19a, see Figures 36-39.

The center of the arc of said recess coincides with the center of the semicircular ends of the boot 69 when the end walls 50 are closed. The length of said recess is such that it extends just below the lower level of the boot when the latter is lowered into the unit A. When the boot is inflated, therefore, it presses the side walls of the bag against the side walls of the carrier unit A, and pushes the end walls of the bag into a substantially semicircular shape, conforming them to the shape of the ends of the boot 69 as they expand into the recess 50a. This is clearly shown in Figure 36.

The upper portions of the end walls 50 have suction heads 19a which communicate, by means of a suitable conduit with a suction source E.

During the operating cycle of the machine at station No. 2, the end walls 50, Figures 2, 31, 32, 35, are first brought into contiguity with the adjacent flanges 17c of the side walls by means of the air cylinder 58. Suction applied through the manifold 19a to the end walls of the bag pulls the end walls into the recesses 50a and closes the openings 50b. A vacuum line 50c is connected to the manifolds 19a, this line leading to a vacuum operated switch 350 which is connected in the electrical circuit controlling the dumping mechanism of the weighing scale (not shown). This switch is normally closed. With a bag in the carrier unit and the end walls thereof sucked against the holes 50b, a vacuum is created in the manifold which opens the vacuum operated switch and allows the scale to dump its charge into the bag. This, then, is a safety device which prevents the dumping of a charge into the carrier unit A unless a correctly positioned open bag is present within it, since the switch will not be operated unless such a bag is present in the carrier. With a paper bag held in open position in the bag carrier unit by suction through manifolds 19 and 19a the boot is lowered into position within the walls of the bag, Figure 34. The boot is then inflated and it expands against the side and end walls of the bag, pressing the bag against the side and end walls, as shown in plan view in Figure 36, the bag at the ends conforming to the curvature of the ends of the boot and extending into the recesses 50a, thus effectively sealing the open end of the bag.

A rotary brush, Figures 31, 33, 34, is provided on each side of the boot 69 at this station, these brushes being supported by the superstructure of the machine. Bearings 86 are fixed to the underside of the superstructure at each end of the boot and a shaft 87 is supported by these bearings, a brush 87a being fixed on each shaft. The ends of the shafts 87 adjacent the central column 12 are extended beyond the bearings and each shaft supports a pulley 88. A motor 89 is supported on the column 12 above said pulleys and is connected thereto and drives same by means of a belt 90. The brushes are so supported with respect to the boot 69 that they may be operated to clean it when the boot is moved to its raised position. The brushes are each encased in a housing 91 which is connected to an exhaust system for exhausting the material cleaned from the boot.

THE JOLTING STATION

At this, the third station, Figures 3, 4, the carrier unit A is identical in construction with that of the unit at the preceding station. The end walls 100 are also generally similar and are similarly operated by air cylinders 58a identical with cylinders 58 described at the preceding station. The end walls 100 at this station however, are bare, at their upper extremities, of the air manifold 19a and the recesses 50a carried by the counterpart walls 50 at the preceding station.

At this station, the filled bag is severely jolted by a jolting mechanism, about to be described, for the purpose of further settling the contents of the bag, the said contents having previously been jogged and settled to a limited extent at the preceding station. The side walls of the carrier, together with the end walls, also fully shape the bag of material at this station in its final form.

The jolting mechanism is positioned substantially centrally beneath the bag carrier unit A at this station and comprises an air cylinder 101, Figures 3, 21, having a piston 102 with a head 102a, the sub-base plate 17b of the carrier unit A resting on the head 102a, as best shown in Figure 29. A control valve for the cylinder 101 generally designated by 103 is positioned at the base of said cylinder, said valve being rotatably mounted in a valve box 104, the box being bored at 105, Figure 23, throughout its length to provide a cylinder, and having an additional radial bore 106 at one side communicating with said bore 105.

The valve body comprises a cylindrical member 107, Figures 25–28, which is bored radially at 107a and has a pair of slotted ports 107b in the wall thereof communicating with said radial port. The other end of said cylinder 107 is bored axially at 107c for a portion of its length, but said bore stops short of said radial port 107a so that a solid wall remains between said radial and axial bores. A pair of slots 107d of a length substantially greater than the length of the slots 107b are provided in the cylinder to communicate with the axial bore. The slots 107b are axially offset with respect to the slots 107d so that said respective pairs of slots are not in axial alignment.

Suitable ring grooves 107e are provided in the wall of the valve body at each end thereof and between the respective pairs of slots to receive rings for sealing purposes against the wall 105 of the valve casing. The valve has an extension 107f which protrudes outside the valve casing and supports a bar 99, Figures 21 and 23, at right angles thereto, the bar being rigidly secured on said extension. One end of said bar is provided with an arcuate cut-out 99a.

The valve box has slots 108b and 108d, Figure 23, corresponding respectively, with the slots 107b and 107d of the cylinder, but these slots in the valve box are in axial alignment. The port 106 is the air inlet port and the open end of the rotary valve 107 is the exhaust port.

A plate 109, Figure 21, is supported between the cylinder 101 and the valve box 104, this plate overhanging the box 104 at one end. A block 110 extends downwardly from said overhanging portion of the palte at one end and is fixed thereto by cap screws 111. A short shaft 112 is rotatably mounted in said block and this shaft carries a sliding, headed pin 113, the pin being loaded by a compression spring 114, positioned thereon between the pin head and the shaft 112, the spring urging the head of the pin into yielding engagement with bar 99, the head being seated in the arcuate slot 99a.

A pair of adjusting screws 115 are also mounted on said plate 109 above the bar 99 and may be used to adjust the stroke of the bar 99 to regulate the alignment of the slots in the valve mechanism, as will be understood by those skilled in the art.

The head of the piston 102a has a short lug 102b extending radially therefrom and a tappet rod 115a is screwed into this lug from the bottom face thereof. This rod extends downwardly through a hole provided therefor in the plate 109 and is arranged to contact one end of the bar 99 on one side of said valve. The rod is further supported and guided by a bored cleat 116 secured to the side of the cylinder 101 adjacent its upper end. A cam 117 is suitably secured to the tappet rod 115a.

Another tappet rod 118 is supported and guided on the side of the cylinder by means of a bored cleat 116a, this tappet likewise extending through a hole in the plate 109, and being arranged to contact the other end of the bar 99 on the other side of the rotary valve. This tappet is substantially shorter than the tappet 115a.

A bell crank lever 119, Figure 21, is pivoted on the cylinder 101 at 120 between the two tappet rods, and the bell crank lever has one arm 119a provided with an adjusting screw 121, the free end of which rests on the upper end of the tappet 118. The other arm 119b of the bell crank lever is inclined towards the tappet rod 115a and lies in the path of the cam 117 carried by said tappet rod.

When the piston 102 is at rest in the position shown in Figure 21 the radial bore 107a of the valve (Figure 27) is aligned with the port 106 of the valve box (Figures 23–24), and the slots 107b (Figure 25) are aligned with the slots 108b (Figure 23) to admit air to the base of the cylinder. At this time the slots 107d and 108d (Figures 23 and 25) are out of register. The length of the stroke desired for the piston 102 is regulated by the adjustment of the position of the cam 117 (Figure 21) on the tappet 115a. As air under pressure is admitted to the valve box it flows through the port 106, bore 107a, slots 107b and 108b (Figures 23, 25, 27), to the base of the piston 102, lifting it. As the piston moves, it carries with it the tappet rod 115a and cam 117 until said cam hits the bell crank lever arm 119b and causes the bell crank to swing about pivot 120, forcing arm 119a over and downwardly, causing screw 121 to push against tappet rod 118 and force it down.

By this action tappet 115a is disengaged from bar 99 and tappet 118 is sharply snapped against the opposite end of the bar 99, causing the valve 107 to rotate in the cylinder, throwing slots 107b and 108b out of registry, thus shutting off the air to the cylinder, and bringing slots 107d and 108d into registry, their large area, combined with that of the axial bore 107c, permitting a quick exhaust of air from the base of cylinder 101, allowing the piston and bar carrier unit A to drop sharply. The spring loaded pin 113 together with the bar 99 form a snap-acting toggle mechanism which effectively prevents the bar 99 and its associated valve 107 from moving out of position except when moved by tappet rods 115a or 118, and quickly snaps the bar into position regardless of its direction of rotation when caused to rotate by the tappet action just described.

The quick exhaust of the air from the cylinder 101 allows the bag carrier unit A with bag and contents to drop by gravity a distance equal to the length of stroke of the piston 102, thus giving a severe jolt to the bag contents, the repeated jolts quickly settling said contents to a greater density in the bag. The dropping of the piston 102 carries with it the tappet 115a, which strikes the bar 99, returning it to its starting position, thereby causing tappet 118 to return to its starting position, pivoting bell crank lever 119 to reposition the arm 119b in the path of cam 117, and the jolting cycle is ready to begin anew.

It has been found from experience, in the case of carbon black, that a substantial number of jolts is required to compact the material to the required density, the number of jolts depending on the particular type and specific character of the carbon black and the length of stroke of the jolting mechanism. In the case of pelletized carbon black, particularly, it has been found that a jolting cycle of from 20 to 60 jolts, each jolt having a stroke of the order of eight inches, is effective to compact the material in the bag to the required density. Generally speaking, the shorter the length of stroke, the greater the number of jolts and the greater the length of stroke, the lesser the number of jolts which will be required to produce the desired result.

It is important for the proper operation of an associated bag sealing machine (not shown) that the depth of material in the bag B be quite uniform, i. e., that the material fill the bag to within a specified distance from the open top of the bag and that this distance not vary appreciably from one bag to another.

In the handling of fluent materials such as pelletized carbon black, for example, there are variations of the size distribution of pellets in the mass, and where bulk material such as this is fed to a hopper (not shown), the finer grains or pellets tend to stay in the middle and the larger, or coarse grains or pellets tend to roll to the walls of the hopper. As the pile of material builds up, there tends to be a partial segregation of coarse and fine materials in the hopper. As the material feeds from the hopper, it may tend first to feed from the middle, causing a hollow portion at that point. Then the sides of the material around this hollow portion may collapse, and the coarse materials from the outer perimeter of the hopper may be fed. As a result, some bags will have more fines than others and the density before compaction of the material may vary from bag to bag causing a variation in the height of the material in the bag. For this reason it is desirable to incorporate a height or depth gauge, Figure 29, at the final compaction or jolting station to determine when the contents of the bag have been compacted or jolted to the proper density or depth in the bag.

Such a gauge includes a plate 122 supported by the superstructure 11a of the frame of the machine, this plate straddling the upper open end of the bag carrier unit A, the bag and its contents at the third station. An air cylinder 123 is mounted on this plate in a central position, its longitudinal axis extending vertically, and a piston 124 is movable in this cylinder, the piston having a double ended piston rod 125, 125a. The rod 125 extends through the cylinder and plate 122 and carries a pad or plate 126 at its lower end, this pad being adapted to be pneumatically projected into the paper bag to "feel" out the height of the contents thereof, as is about to be described.

The upper end of the piston rod 125a carries a switch actuating finger 129. An air cutoff switch 130 is supported on the plate 122 by a telescopic post arrangement 131 whereby the height of the cutoff switch may be adjusted as necessary. The switch has a contact arm 130a which lies in the path of the finger 129.

The cylinder 123 is provided with suitable ports 127, 128, one on each side of the piston 124, each functioning alternately as an inlet and exhaust port as air is supplied and exhausted, the port 127 being alternately opened to the atmosphere and to the high pressure air source through a valve to supply and exhaust the air during the operating cycle.

The port 128 is open at all times to the surge tank 128a. Tank 128a is supplied with low pressure air through pressure regulator 128b from the high pressure air source, and is vented through throttle valve 128c. The purpose of the vent is to prevent the buildup of pressure in tank 128a which might be caused by the malfunctioning of valve 128b or by a temperature rise of the air.

The cutoff or limit switch SW–130 controls the flow of air to the jolting cylinder 101. Air under controlled low pressure is constantly admitted to the upper side of piston 124. When the high pressure air on the lower side of piston 124 is exhausted, this sends the piston 124 and pad 126 downwardly until the pad rests lightly on the bag contents, this taking place during the jolting cycle while the contents of the bag are still above the desired height. As the material in the bag becomes compacted by jolting, the pad settles with the contents and slowly brings the finger 129 towards the cut-off switch. At the instant the bag contents have settled to the required level the pad senses it and at this time the finger 129, which was simultaneously urged downwardly, engages the contact arm 130a of the cutoff or limit switch SW–130 which actuates a solenoid valve to shut off the air to the jolting mechanism and admits high pressure air through port 127 to the underside of piston 124, thereby raising the piston and the pad with it. As the piston rod 125 (Figure 29) moves upwardly, and the pad 126 approaches the upper limit of its stroke, it actuates limit switch SW–130' to initiate movement of the compacted bag and the carrier unit to the discharge station. The boss 126a of the pad 126 acts as a stop to limit the upward stroke of the piston rod 125.

Since a measured charge of material is delivered into the bag, and the proper depth of the contents thereof with respect to the bag opening can be determined in advance, it is a relatively simple matter to set the cutoff switch SW–130 at the proper height with respect to finger 129 to perform its function. It will be obvious from the construction that if the bag contents are too high when tested by the pad 126, the switch SW–130 will not be energized, and since a measured charge is delivered to the bag, as indicated above, the contents of the bag cannot ordinarily fall below the desired level.

When the feeler gauge has determined that the contents of the bag have been jolted to the required density or height, and the air to the jolting cylinder has been shut off, the bag is ready to be shifted to the next, and discharge station. The turn-table 13 is thereupon rotated about the column 12 to shift the arms 15 and the bag carrier unit A to the fourth station.

DISCHARGE STATION

At this, the fourth station, Figures 4, 30, 40 and 41, the filled and compacted bag of material is automatically ejected from the machine to a conveyor or other means, whence it is conducted to a sealing machine (not shown) where the open end of the bag is closed and sealed.

At this station the superstructure 11a includes inwardly facing channels 11a' which form an overhead trackway to support the bag ejecting mechanism. This trackway is supported directly over the carrier unit A and the filled bag, and extends outwardly a short distance beyond the forward edge of the bag carrier unit A so as to overhang the frame 11, as shown at 11a, Figure 40.

Figures 40, 41:
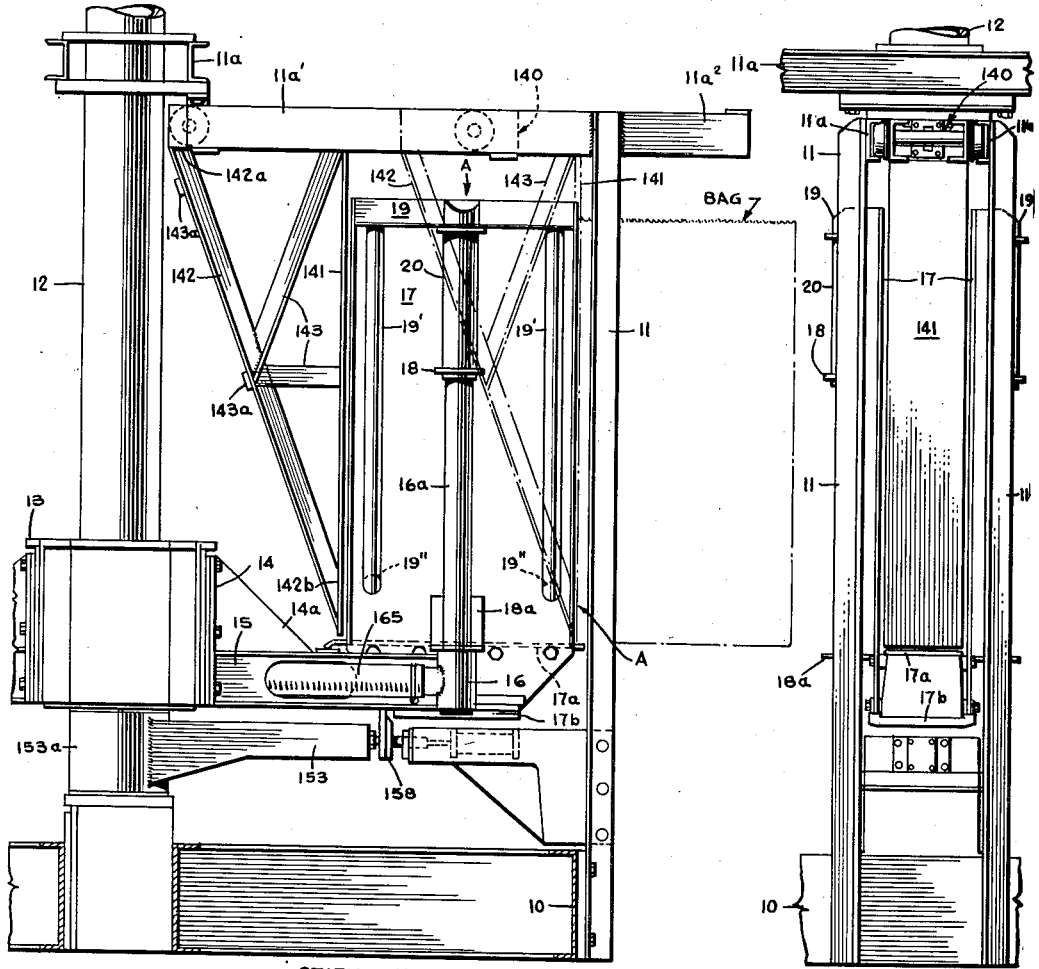
Figure 40 is a side elevation of a part of the machine at station No. 4, the discharge station.
Figure 41 is an end view thereof.

A suitable carriage 140, mounted upon rollers running along the overhead track 11a', supports a downwardly extending follower plate 141 which is arranged in a substantially vertical position, and when at rest is located directly behind the bag carrier unit A when the latter is in position at this station as shown in Figure 40. The height and width of this plate 141 is such that it may easily pass between the side walls 17 of the bag carrier unit when so actuated. The follower plate is backed up by pairs of structural members 142 secured to the carriage at 142a and to the plate at 142b, and suitably braced, as by members 143 and cross bracing 143a to give said follower plate substantial rigidity.

An air cylinder 144 (Figure 30) is provided to reciprocate the carriage 140 on its trackway. This cylinder is supported from the framework of the machine and the piston rod is directly connected to the carriage 140.

With the filled bag in position in the bag carrier unit A at this station, operation of the air cylinder 144 forces the carriage and follower plate radially outwardly with respect to the central column 12 and pushes the filled bag bodily out of the bag carrier unit A onto a table, conveyor or other receiving mechanism (not shown). When the piston of the air cylinder 144 is actuated by air pressure behind it, the follower plate 141 is moved to eject the bag. On completion of its ejecting stroke air is exhausted behind the piston and air is supplied in front of the piston to return it to its starting position, carrying the follower plate 141 with it. The machine has now completed one full cycle of operation.

It must be understood, however, that the operation is an automatic and continuous one, with several of the various functions described taking place at the several stations simultaneously, after the completion of the first cycle.

This means that as soon as a bag has been opened and fixed in the bag carrier unit A at station No. 1, and moved to station No. 2 for filling and jogging, station No. 1 is repeating its operation with a second bag. While the filled bag is moved from station No. 2 to No. 3, where it is jolted, the second bag from station No. 1 is being rotated to station No. 2 for filling. The first bag at station No. 3, having been jolted, is then moved to station No. 4 and discharged. Each movement of the turn-table advances a bag to the next station and the process is automatic and continuous so long as the machine is in operation.

Indexing mechanism

The mechanism for indexing or rotating the turntable is mounted on the base 10 adjacent the column 12, Figures 15, 16, 30. It comprises a motor 150, having a shaft 150a, and a speed reducer 151, having an input shaft 151b and an output shaft 151a. The motor shaft 150a and reducer input shaft 151b are in axial alignment, and are connected by a magnetic clutch 152. A magnetic brake 157 is connected to the input shaft 151b.

A driven or indexing arm 153, having a hub 153a suitably bushed with an antifriction bearing, is mounted on the center column 12, Figures 15 and 16, and in its rest position lies centrally located beneath the bag carrier unit at the third station, Figure 15. At its free end this arm is bored axially to provide a socket 153b. A spring loaded, shouldered pin 154 is positioned in this socket, the pin being suitably held thereon by means of a threaded bushing 155 screwed into the socket.

The output shaft of the reducer 151a, Figure 15, carries a driving link 155, which is keyed to said shaft. A connecting link 156 is pivoted at one end to the free end of the driving link 155 and at its other end to a point 156a on the driven arm.

A cam plate 158 is fixed to the underside of each pair of arms 15 of each bag carrier unit A. This cam plate has a centrally located hole 159 of a size sufficient to accommodate the end of the spring loaded latch pin 154. When the driven arm 153 is in starting position at station No. 3, Figure 16, the latch pin is engaged in said hole. It is at this point that the driving mechanism is connected to the rotating assembly of the turn-table.

With the motor started, and the clutch 152 disengaged, the brake 157 engaged, the linkages just described would be in their normal and starting position, as shown in Figures 15 and 16.

At the fourth station, and below the lower plane of the arms 15, an air cylinder 161, Figures 4 and 15, is fixed to the frame of the machine. This cylinder has a piston rod 161a projecting therefrom, this rod being in axial alignment with the axis of the hole 159 in plate 158, the pin projecting into the hole of the plate 158 of that particular bag carrier unit A positioned at said fourth station at that time. The purpose of the cylinder 161 at this station is to unlatch the pin 154 from the plate 158 when the indexing arm 153 has performed its function of moving the bag carrier unit A to the fourth station, and the arm is ready to be returned to its starting position (Figure 15), as will be more fully explained in the operation of the machine.

The low pressure air system

The low pressure air system supplies the suction required at stations 1 and 2. Suitable suction blowers are provided and are connected to the several air conduits as follows:

Within the turntable four Y-connections 163 are mounted, one for each station (Figure 14). One branch 163a of each Y member is permanently connected, respectively, to an air opening 13a formed in the upper surface of the turntable 13 (Figures 14, 19, 20), four of such openings being provided, one for each bag carrier. The other two branches 163b of each Y project through openings 164 which are formed in each side wall of the turntable and these branches pass through corresponding openings formed in the walls of the brackets 14. Each of the branches 163b is connected by a suitable conduit 165 to its respective hollow boss 16 (Figure 1), said conduit passing through openings cut in the webs of the arms 15 as shown.

An annular recess 166, Figures 17–20, is provided in the upper surface of the turntable, and an oscillating annular plate 167 is seated in said recess. Said oscillating plate has one suction opening 167a which is coextensive in size with the openings 13a and during the operation of the machine, said suction opening 167a is consecutively brought into axial alignment with said openings 13a as will be explained. A short nozzle 167b is connected to said opening 167a and leads to low pressure suction source E, through a suitable conduit.

A collar 168 is suitably pinned to the column 12 above said oscillating plate and a pair of ears 168a (Figure 17) project outwardly of said collar, said ears supporting a spring loaded stopping pin 169. A stop block 170 is permanently fixed to the oscillating plate 167. A coiled tension spring 171 is hooked at one end to the stop block 170, passes around the column 12 above the collar 168 and is anchored at its other end to said collar at 171a.

A small air cylinder 172 (Figure 18) is fixed to the oscillating plate 167, and the piston 173 thereof has its rod 173a extending downwardly, said rod 173a being surrounded by a compression spring 174 which normally urges the piston upwardly. The lower end of the rod 173a is shouldered at 173c, and has a reduced extension forming a latch 173d. The shoulder 173c rests on the base of the cylinder and limits downward movement of the piston rod. Said reduced extension projects through the oscillating plate 167 and through the upper surface of the turntable 13 and functions to lock them together when air pressure is applied to the top of the piston. An air inlet port 175 is provided for said cylinder to admit air under pressure above the piston. Exhaust port 176 is provided in the wall of this cylinder to exhaust air below the piston.

Figure 18:
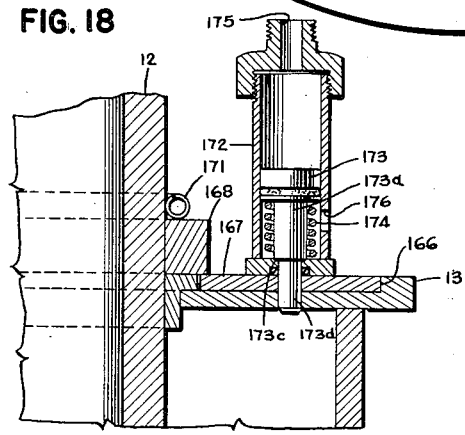
Figure 18 is a vertical sectional detail of a latching mechanism taken along the line 18—18 of Figure 17.

With a bag in position on the carrier at station No. 1, the cylinder 172 with its associated parts will be in the position shown in Figure 18, with high pressure air acting on top of the piston 173 to latch together the plate 167 and the turntable 13.

Figure 19:
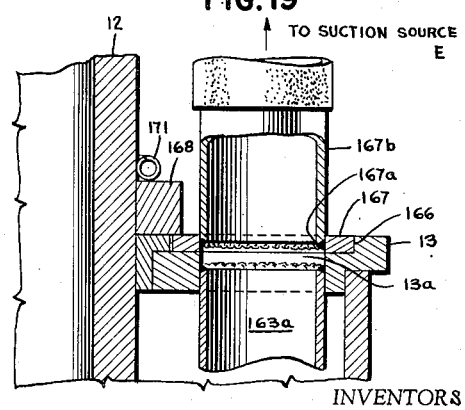
Figure 19 is a vertical sectional detail of the air connection on the turret, taken along line 19—19 of Figure 17.
Figure 20:
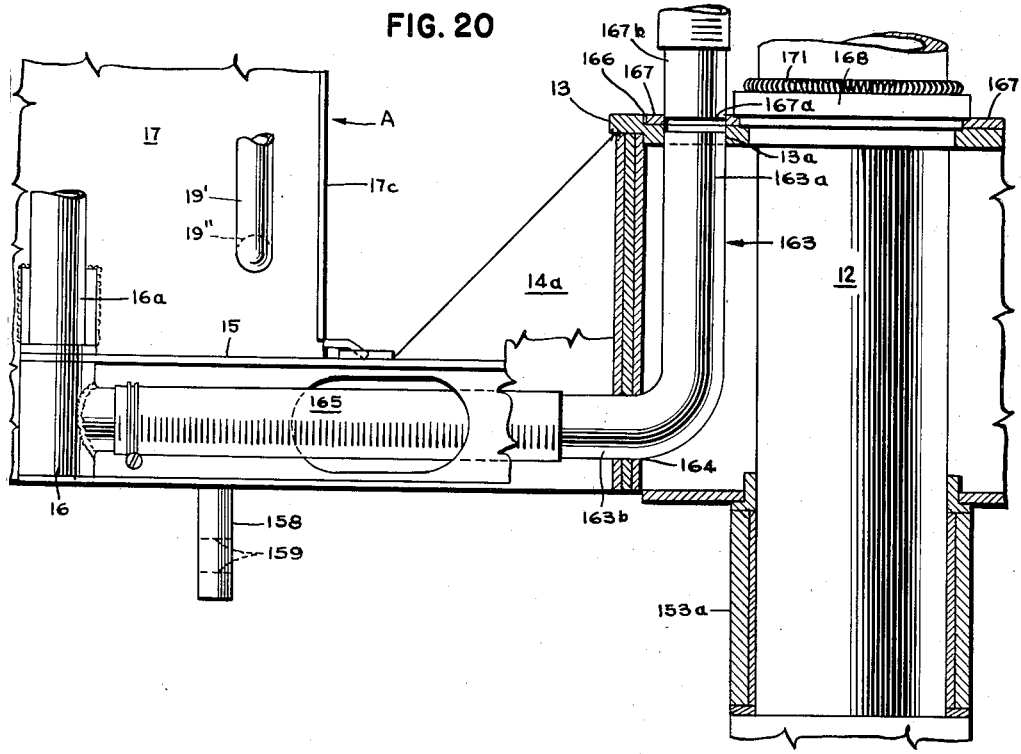
Figure 20 is an elevational detail of a portion of the central column and the bag carrier support, with a portion of the turret in section, showing the air connection between the turret and the bag carrier.

As the turn-table is rotated from station No. 1 to station No. 2, the plate 167 and attached cylinder 172 will move with it. Meanwhile, the suction from source E is taking effect on the bag in the carrier unit A through nozzle 167b and the associated conduit 163a to hold the bag open while it is shifted from station No. 1 to station No. 2 (Figures 14 and 19). With the oscillating plate 167 latched to the turn-table, the openings 167a and 13 are in alignment so long as the carrier holding the open bag is at station No. 1. This connection allows suction to be continuously applied through the manifolds 19 to the side walls of the bag by means of conduit 165.

When the carrier is moved to station No. 2, the spring 171 is extended. Air will be exhausted above the piston 173 and spring 174 will force it upwardly to unlatch plate 167 from the turn-table. Spring 171, Figures 17, 18, will then snap the oscillating plate 167 and cylinder 172 back to their starting positions, to supply suction to the new bag being opened at station No. 1.

Having now described the construction of the machine we proceed to a description of its operation and functions.

OPERATION—STATION 1

A brief description of the operation has previously been given. At this point, the operating cycle will be reviewed in detail, and each phase (movement from station to station) of the cycle will be effected automatically until a bag is supported at each station.

Two low pressure air handling systems are provided together with one high pressure air system, and necessary electrical circuits and switches are installed to operate the several solenoid controlled air valves and other electrical parts of the machine.

In starting the machine into operation the bag magazine 31 is first filled with a supply of paper bags B and then a master switch (not shown) is thrown which sets into operation the driving motor 150, the brush motor 89, the low pressure air supply sources D and E (Figures 5 and 6), and a high pressure air supply source F (Figure 42). The control circuit of the machine is also connected to a source of electric current G (Figure 43). To start the machine in operation, the automatic start switch button (Figure 44) is actuated manually. This action causes the clutch 152 to be engaged and the brake 157 to be disengaged, causing rotation of input shaft 151b, which in turn causes rotation of output shaft 151a. Rotation of the shaft 151a causes driving link 155 to be rotated, which motion in turn is transmitted to the connecting link 156, pulling indexing arm 153 in a clockwise direction, Figures 15 and 42, from station 3 to station 4. This is the limit of its travel.

When said indexing arm 153 is moved in a clockwise direction, it pulls the entire turn-table, including arms 15 and bag carrier units A with it, continuing its motion until said indexing arm has rotated 90° from its starting position. The driving link 155, in the meantime, has accomplished a rotation of 180°.

The indexing arm moves only between stations 3 and 4, and just prior to the moment it reaches the limit of its clockwise movement, it strikes the contact arm 160a of a limit switch SW-160, Figures 15 and 42, suitably mounted on the frame of the machine. Switch 160 actuates valve 207 which admits air under pressure behind the piston of the cylinder 161, extending the piston rod 161a into the hole 159, Figure 16, pushing pin 154 back into its socket, thereby disengaging the indexing arm 153 from its keeper, the cam plate 158, locking the turn-table to the frame of the machine, and permitting indexing arm 153 to return to its starting position at station No. 3.

Since the motor 150 is running continuously, the driving link 155 continues to swing in a clockwise direction until it accomplishes 360° of rotation, at which time the indexing or driven arm 153 will have been returned 90° in a counterclockwise direction to its starting position. As it moves into its starting position, it strikes the arm 162a (station No. 3, Figures 15 and 42) of limit switch SW-162 which acts to de-energize clutch 152 and energize brake 157, thus disengaging motor 150 from reducer 151, and stopping rotation of the reducer and connected linkage of the driving mechanism.

As the driven arm 153 returned to its starting position the pin 154 was cammed against the keeper, plate 158 and snapped into the hole 159, thereby locking the driving mechanism to the turn-table arms 15. The foregoing action rotated a carrier unit from station No. 4 to station No. 1.

Simultaneously with the beginning of the said rotation, high pressure air from source F (Figure 42) is admitted to air cylinder 35 (Figure 5), through solenoid actuated valve 202, causing arm 40 to swing up. As suction was already applied to arm 40, and thereby to suction head 42, the uppermost bag B in the magazine 31 is lifted to a position beneath and slightly past or behind the blower nozzle 46 so that the bag is slightly offset laterally with respect to said blower nozzle. The bag is held closely against the suction head 42 by suction, with air blowing past the closed mouth of the bag at this point, the direction of the air stream being parallel to the side wall of the bag as shown in Figure 5. The nozzle 46 being elongated (Figure 7) it sends said air stream along a substantial portion of the bag surface adjacent its mouth. The path of the air stream along the free side wall of the bag creates a venturi effect along that side by creating a low pressure area along said side which causes said side to move away from its adjacent side which is held by suction head 42. This action moves said free side of the bag directly into the path of the air stream, thereby permitting said stream to blow into the bag and to blow it wide open.

While the upper open end of the bag is supported substantially flush with the top of the suction head, the lower portion of the bag is supported within the walls of the chute and extends downwardly therein to a point just below the upper edge of the wall 30a of the chute (Figure 5). When the bag B is blown open the folded bottom of said bag unfolds downwardly to a substantially horizontal position, as shown in dotted lines, and substantially closes off the entire area of that portion of the chute just below the upper edge of the wall 30a. Then air from high pressure source F is admitted to jack 28 through valve 201, raising the pedestal 29 into contact with the plate 17b, the gasket 29a sealing the joint between the two (Figure 1). The pedestal is connected by suitable conduits to the intake side of blower D. The action of jack 28 in raising the pedestal to seal the joint between it and the base also raises the entire bag carrier unit A until the topmost surface of unit A effects a seal against gasket 47 secured to the lower edge of chute 30. This raising action takes the weight of the bag carrier unit A off the arms 15.

The base 17a of the bag carrier unit projects beyond the flanges 17c at each end (Figures 1 and 11). The end walls 25 overhang the projecting portion of the base to the extent that when the bag enclosure unit is raised said portions of the base engage the lower edge of said end walls and raise them, thereby causing the four-bar linkage supporting said end walls to function as toggles and close said end walls against the flanges 17c.

Suction is being continuously supplied from source D downwardly through the chute, through the bag carrier unit A, around the bottom thereof, through pedestal 29 and thence through air conduits, back to said source. As soon as unit A has been lifted to seal against gasket 47, the bottom of bag B having already closed off the chute, as described above, a low pressure area is created below the bag. The suction then takes effect on the bottom of the bag and this, together with air blowing simultaneously into the bag from the nozzle above is sufficient to dislodge the bag from the suction head and the bag is forced downwardly into bag carrier unit A.

As previously stated, when the high pressure air was turned on the air acted in cylinder 172 (Figure 18) to force piston 173 down so as to latch together the plate 167 and top of turn-table 13. The rotation of carrier unit A from station No. 4 to station No. 1 by rotation of the turn-table, also rotates the plate 167 through an arc of 90°, shifting nozzle 167b clockwise from station No. 1 to station No. 2.

Simultaneously with the admission of air to jack 28 to raise unit A at station No. 1, air is exhausted from the upper side of cylinder 172 through valve 201, allowing spring 174 to unlatch pin 173d from plate 13. This allows plate 167 and the attached mechanism, including cylinder 172, to rotate counter-clockwise, back to its starting position at station No. 1, under the pull of spring 171.

Suction from source E flows continuously through the conduit from that source to the turn-table connection 167b, and thence through conduits as previously described to the manifolds 19, where the suction takes effect directly along the upper open edge of the side walls of the bag B to hold said side wall open in the carrier unit A, the end walls of the bag at this time not yet being fully opened. Suction is also applied through tubes 19b to the walls of the bag near its bottom.

At this point in the operation, solenoid valve 201 (Figure 42) is actuated to exhaust the air from the lower side of the piston of jack 28 and to admit air to the upper side thereof to force the piston down and lower the pedestal 29 of the jack from contact with plate 17b. This lowers the bag enclosure unit A so that its weight is again supported by the arms 15, and thereby lowers the base 17a from contact with the end walls 25, which drop of their own weight, the toggle mechanism pulling said walls away from the bag carrier unit A, so that said unit is free to rotate to the next station minus the end walls 25.

Simultaneously with the lowering of jack 28 air is admitted to the upper end of cylinder 172 (Figure 18) thereby again latching plate 167 to the turn-table top 13.

At this time solenoid operated valve 202 is energized to admit air to cylinder 35 (Figure 5) to extend piston rod 36 thereby lowering suction head 42. This action again places the suction head in contact with the uppermost bag in the magazine 31. The carriers at stations 2, 3 and 4 are empty.

STATION NO. 2

Carrier unit A is now rotated to station No. 2 with the bag it received at station No. 1. The bottom of the plate 17b of the carrier unit is bevelled along its outer side edges (Figure 12). The top surface of the head 49 of the jogging cylinder 48, at station No. 2 (Figure 2), lies in a plane slightly higher than that of the bottom of plate 17b of the bag carrier. As the unit is rotated to the second station, therefore, the unit is cammed upward slightly when said bevelled edge hits the edge of the head 49 of the jogging cylinder. This lifts the weight of said unit off the arms 15 and places it on the jogging cylinder 48.

Valve 203 admits air under pressure from source F to the air cylinders 58, at each end of the bag carrier. This forces end walls 50 into contact with flanges 17c of the bag carrier closing the ends of the unit as shown in Figure 31. As suction is continuously applied from source E to the manifolds 19a of the end walls 50, this suction pulls the end walls of the bag B fully open into the recesses 50a in said end walls (Figures 36 and 38).

Valve 203 simultaneously admits air to the upper ends of cylinders 64, thereby moving boothead 66 into position within bag B (Figures 33 and 34). Then air from source F is admitted to the boot 69 through a pressure regulator (Figure 42) by means of solenoid operated valve 204. This inflates the boot which expands and presses the bag against the side walls of unit A and into the arcuate recesses 50a of the end walls 50, thereby sealing the boothead to the bag.

Solenoid operated valve 201 (Figure 42) now admits air under pressure from source F to the jogging cylinder 48 to initiate the jogging action at this station. During the jogging the end walls 50 are supported in their reciprocating motion by the rollers 56 (Figures 31 and 32) which rollers ride on the tracks 52 secured to said walls.

Simultaneously, the control mechanism of a batching scale (not shown) is operated electrically to dump a weighed charge of material through spout 63 into the bag B, which is being jogged. At the conclusion of the desired jogging period solenoid operated valve 201 acts to cut off the air to the jogging cylinder 48.

At the conclusion of the jogging, solenoid operated valve 203 reverses the action of the piston in cylinders 64 to lift the boothead 66 and causes a reversal of the action of the piston in cylinders 58, thus opening the end walls 50. Simultaneously with the operation of valve 203 valve 204 is operated to discharge air from boot 69, thus breaking the seal heretofore established between the spout 63 and the bag.

When the boothead 66 in lifted, the boot 69 is brought into contact with the rotating sweeping brushes 87a, which clean the boot of any dust which may have accumulated, said dust being carried away by suction from source E.

We are now ready to rotate the filled bag to station No. 3, the jolting station.

THE JOLTING STATION NO. 3

At this station the filled bag is jolted quite severely to settle and compact its contents to a level which will permit efficient closing and sealing of the bag.

Operation of switch SW-160 by arm 153 causes solenoid operated valve 205 to supply air to the cylinder 101 of the jolting mechanism and to cylinders 58 at station No. 3 to close the end walls 100 at that station. The jolting as previously fully described begins immediately.

At a predetermined time during the jolting interval solenoid valve 206 acts to exhaust the air from the lower side of cylinder 123. This has the effect of lowering the pad 126 (Figure 29) which then comes in contact with the upper surface of the material in the bag during the jolting operation. The pad 126 rides on top of the material with each jolting stroke and settles as the material settles, the pad being kept in contact with the material by the regulated air pressure above the piston 124, the air in the surge tank 128a functioning as a spring on said piston.

When the required level of the material in the bag has been reached, finger 129 actuates arm 130a of switch SW-130 to set in operation solenoid valve 205 which cuts off the air to the jolting cylinder, and which simultaneously admits air to the cylinders 58a to reverse the stroke of the pistons, opening the end walls 100.

Switch 130 simultaneously actuates the solenoid operated valve 206 to admit air to the lower side of piston 124 of cylinder 123 to raise the pad 126 out of the bag and bag carrier unit.

As the pad rises, it hits the arm of switch SW-130' which energizes the clutch 152 and de-energizes the brake 157 to set the driving mechanism in motion, rotating the bag carrier unit in the manner previously described to the fourth and last station. As has previously been described, actuation of arm 160a of switch SW-160 by indexing arm 153 simultaneously causes actuation of a solenoid operated valve 207 to operate cylinder 161, causing piston rod 161a to be extended, thus disengaging pin 154 from cam plate 158 (Figure 16) as previously described, locking the turn-table to the frame of the machine.

STATION NO. 4

At this station (Figures 4, 40 and 41) the movement of the follower plate 141 is coincident with the movement of the jack 28 at station No. 1, as the same solenoid operated valve 201 admits air to cylinder 144, causing piston rod of air cylinder 144 to be extended, moving the follower plate outwardly on its carriage to eject the bag held in the bag carrier unit A. The angular arrangement of the side walls of the carrier (Figure 11) with respect to the bottom thereof reduces the friction between the compacted bag and the side walls of the carrier, permitting easy discharge of the bag from the machine.

Simultaneously with the retraction of the piston of cylinder 144, follower plate 141 is likewise retracted, by a reversal of the direction of motion of the piston in cylinder 144. The bag carrier unit A is now automatically rotated from station No. 4 to its starting point at station No. 1 and the cycle is repeated automatically.

A summary of the several air systems, switches and their functions follows in outline form to supplement the foregoing description.

Low-pressure air system:

Blower D.—Blower D (Figure 5) is a low-pressure blower which provides both suction to unit A at station 1 (Figure 1) and low-pressure air to blow nozzle 46 (Figures 5 and 7) to open the bag and to suck the bag from the pickup suction head 42 downwardly into the bag carrier unit A, as appears from Figures 1, 5, 7, 11, 12 and 13 of the drawings.

Blower E.—Blower E is likewise low-pressure blower or blowers. This blower provides:

(1) Suction to bag pickup head 42 (Figures 5, 6, 8, 9, 10) to lift the bag B from the stack.

(2) Suction to manifolds 19 (Figures 1, 2, 5, 11) at stations 1 and 2 to hold the sides of the bag open in the bag carrier unit.

(3) Suction to manifolds 19a (Figures 33, 35, 38, 38a) to open the ends of the bag into recesses 50a of the end walls 50.

(4) Suction to exhaust the carbon black dust from housings 91 surrounding brushes 87a (Figures 33, 34).

High pressure air system F is derived from a compressor (not shown) and the air flows through the valves indicated to operate air cylinders at stations as follows (Figure 42):

| Valve | Turn-table | Cylinders at— | | | |
|---|---|---|---|---|---|
| | | Station No. 1 | Station No. 2 | Station No. 3 | Station No. 4 |
| 201 | 172 | 28 | 48 | | 144 |
| 202 | | 35 | | | |
| 203 | | | 58–64 | | |
| 204 | | | Boot 69 | | |
| 205 | | | | 58a–101 | |
| 206 | | | | 123 | |
| 207 | | | | | 161 |

SWITCH FUNCTIONS

| Switch on Machine | Function |
|---|---|
| SW–130 | Reverses valve 205, which exhausts cylinder 101, stops the jolting action of that cylinder and retracts the pistons of cylinders 58a, opening end walls 100 at station 3 (Figures 3, 30). Reverses valve 206, which causes piston of cylinder 123 to retract, lifting sensing pad at station No. 3 (Figure 29). |
| SW–130' | Causes machine to start the indexing. |
| SW–160 | In path of indexing arm 153; reverses valve 207 causing piston of cylinder 161 to extend, latching the turn-table and releasing the indexing arm (Figure 16); reverses valve 205, admitting air to jolt cylinder 101, and to cylinders 58a to extend the pistons of said cylinders 58a; to close end walls 100; starts the timer T. |
| SW–162 | In path of indexing arm 153; acts to de-energize the clutch and energize the brake when the indexing arm 153 reaches its zero position (Figure 42). |

| Switch on Control Panel | Function |
|---|---|
| SW–4 | This is the start switch which starts the indexing cycle. |
| SW–5 | This is the normal stop switch which, when thrown to the stop position, will cause the machine to stop at the completion of a cycle. The end of the cycle occurs just before indexing starts. |
| SW–6 | This is the emergency stop switch which, when thrown to the stop position will stop the machine anywhere in the cycle. Returning the switch to the run position starts the machine where it was stopped. |
| SW–9 | This is the scale hold switch which prevents the scale (not shown) from dumping when turned to the hold position. |
| SW–22 | This switch is used to stop or prevent jolting action at station No. 3. |
| SW–23 | This switch is used to by-pass the vacuum safety feature at station No. 2. |

ELECTRICAL CONTROLS

With reference to Figure 43, a schematic of the electrical control circuit is disclosed. The electrical control circuit comprises a plurality of solenoids S–201 through S–207 which control the valves correspondingly designated in other figures as 201 through 207. Except in the case of S–205, each of the solenoids has an "Extend" and "Retract" coil, designated as such, whereby the respective valves may be shifted to either of two limiting positions. The several solenoids are controlled by a plurality of relays having solenoids designated as 1CR through 9CR wherein each of said relays has one or more contacts designated by the relay reference character and a sub-script; for example, contact 5CR$_a$, as shown. Control of the relays is had to a large extent by means of a plurality of rotary cams designated as a cyclic "Timer." One such cam T$_c$, is shown in the diagram of Figure 43a. Each of such cams rocks a lever L downwardly biased by a spring S about a pivot P. It will thus be noted that the outer end of the lever can alternately engage a pair of fixed contacts; for example, fixed contacts designated by arrow heads in Figure 44 which are connected to respective conductors indicated as T–4a and T–4b, and which will be referred to as "Contact T–4a, etc."

hereinafter. The lever itself constitutes a common terminal and is connected to one of the contacts of relay 6CR which are located at the timer, viz., contact 6CR$_b$. Thus it will be apparent from consideration of Figure 43a that the arrangement constitutes a single pole, double throw switch which is periodically operated by the cam T$_c$. Further, it will be understood that there are six such cams which constitute the cyclic timer for operating a series of switches T–1 through T–6 for purposes to be hereinafter described, each of the switches T–1 through T–5 (not T–6) having an associated relay 6CR contact.

It should be noted by reference to Figure 44 that although the switches T–3, T–5 and T–6 are shown as having two contact points, indicated by arrowheads, in each instance only one point is used in this circuit, the other being left disconnected.

The cyclic timer is symbolically designated by a time diagram in Figure 43. Thus, each cam is represented in terms of the time during which it activates a lever for the purpose of effecting connection to one or the other of the contacts of the switches T–1 through T–6. Accordingly, it will be apparent that current through any of the contacts 6CR$_a$ through 6CR$_e$ will be conducted to one contact or the other of the respective switches T–1 through T–5 as represented by the length of the black bars, in a manner well understood.

Various limit switches are carried by parts of the machine so as to be engaged by the indexing arm as it travels in its oscillatory motion; such switches being disclosed as SW–162A and B, SW–160, SW–130', and SW–130, and their effect in controlling the circuit will be apparent from the description of the operation thereof under various conditions which now follow.

*Automatic operation.*—There are four manually operated switches that control automatic operation as follows:

(1) A push button switch SW–4 designated as "Start" on the panel diagram, Figure 45. This switch is normally open but is manually closed momentarily.

(2) A single throw toggle switch SW–5 (on panel) having three poles designated on Figure 43 as SW–5A, SW–5B, SW–5C. In Figure 45 the open position of the switch is labeled "Normal Stop" while the closed position is labeled "Run." All poles are shown as open; that is, Normal Stop, in Figure 43.

(3) A single throw toggle switch SW–6 (on panel) having two poles designated as SW–6A and SW–6B in Figure 43. On the panel diagram of Figure 45 the switch is designated for "Run" and "Emergency Stop" positions, in which latter position the poles are open, as shown in Figure 43.

(4) A single throw, single pole toggle switch designated as SW–9 on Figure 43. This switch controls the scale and is labeled "Run" and "Scale Hold" in Figure 45. The switch is shown in open position, or "Scale Hold" on the panel.

Assuming the main driving motor and the blowers of the machine are in operation and air pressure is available for the various pneumatic cylinders, the following circuit operations take place, with reference to Figure 43. Power from a 110-volt, 60-cycle A. C. line is fed to busses 304 and 305, switch SW–4 being in the open position at that time and the other switches enumerated above in their Normal Stop, Emergency Stop, and Scale Hold positions, respectively. The machine is now in standby automatic condition wherein, although not running, 90-volt D. C. power is available at the output terminals *a* and *b* of a "Clutch Brake Rectifier" designated as such, of conventional design. The input of the rectifier is, of course, provided by the busses 304, 305, while the D. C. output is utilized as will be apparent, for operation of the clutch CL solenoid and the brake solenoid BK, designated as such on Figure 43. Preferably the rectifier is of the gas tube type and has capacitor filters whereby the brake and clutch coils are shunted by connections to the terminals *c* and *d* to reduce arcing of certain relay contacts of relay 1CR. Thus, the brake coil is energized at this time through closed contact 1CR$_a$ and although the main drive motor is rotating, the indexing arm of the machine is held stationary by the brake. The clutch coil is not energized at this time because of an open contact, 1CR$_b$.

Power from the line also flows through the coil of a relay designated as 5CR and through the contacts of a pressure switch 310 which is closed when normal pressure exists in the main air line.

The energizing of relay 5CR closes the normally open contact 5CR$_a$ allowing power from the line 304 to energize the control bus 312 through normally closed relay contact 8CR$_a$ of a relay 8CR which is not energized except for manual operation. A control bus 314 offers a direct return path to the other side of the line 305. Any closed circuit between buses 312 and 314 would allow power to flow between the lines 304, 305 from the line.

Relay coil 1CR is not energized because pole SW–5B is open, "Normal Stop" position, and because a pole SW–162A of a two pole limit switch is open. This limit switch is located on the machine and has another pole SW–162B normally closed.

The cyclic timer comprising the series of cams such as Tc (Figure 43a) is operated by a motor M controlled by a relay coil S which is not energized at this time because a limit switch SW–160 is open. Switch SW–160 is located on the machine and can be momentarily closed by the indexing arm as it reaches its 90° position. Relay coil S serves to control motor M for rotating the timer cams as will appear.

Relay coil 4CR is not energized at this time because of open switch SW–160.

Relay coil 8CR is not energized at this time because of the open pole SW–11A of a push button switch on the panel. The pole SW–11B is normally closed. This switch is labeled "Manual" on the control panel diagram.

Relay coil 9CR is not energized at this time because of the open contact 8CR$_b$.

Relay coil 3CR is not is not energized because a switch SW–130 and pole SW–5A are open. Switch SW–130 is a limit switch located on the machine; it is closed when the feeler arm 129 (Fig. 29) reaches the limit of its extended position.

The timer drive motor M does not run because pole SW–6A is open and because a pole SW–M$a$ of a single pole double throw motor control switch is open. Pole SW–M$b$ of this switch is closed and located between the line 304 and relay coil 8CR. Switch SW–M$a$ and SW–M$b$ is a cam operated switch which will be understood to be located on the cyclic timer. The switch is actuated by the coil S and remains closed until the 360° position of the cyclic timer is reached.

Relay 6CR is not energized because of the open pole SW–6A.

Relay 2CR is not energized because switch T–5 of the cyclic timer is open and because of an open contact 4CR$_a$ and an open contact 6CR$_a$.

Note that open contacts 6CR$_{a-e}$ prevent voltage feed to the cyclic timer switches T1—T6.

Power feeds through closed pole SW–20B of panel switch SW–20 through closed contact 4CR$_a$ to the lowermost (retract) solenoid S–207. This energized the solenoid causing the valve 207 to shift to the retract position.

Voltage is available at this time up to the open contact 6CR$_f$.

In order to operate the machine, switches SW–5, 6 and 9 are thrown to "Run" positions.

The closure of switch SW–6 energizes the coil of relay 6CR and closes 6CR relay contacts 6CR$_a$ through 6CR$_j$. A normally closed contact of 6CR$_k$ is opened.

Power now feeds from the bus 312 to five switches, T–1 through T–5, of the cyclic timer.

Since the cyclic timer remains at rest in the zero position, power passes through the switch point designated by the lead T–1b to conductor 320 via contact 6CR$_e$. Likewise power goes from T–2b to 6CR$_d$; from T–4b to 6CR$_b$; from T–5a to 6CR$_a$; and thence to open contact 4CR$_b$.

From T–1b voltage is fed to the lowermost (retract) solenoid S–203 and to a return bus 322. This shifts valve 203 to the retract position.

From the switch point designated by conductor T–2b voltage is fed to an open contact 1CR$_a$. This contact prevents the energizing of the retract solenoid S–202 at this time.

From the switchpoint designated by conductor T–4b voltage is fed to the retract solenoid S–204 and through closed contact 6CR$_g$ to the retract solenoid S–201. Power feeds from these solenoids to the return bus 322.

Voltage feeds through bus 326 through the closed contacts 6CR$_i$ and 6CR$_j$ and through a closed contact 2CR$_a$ of relay 2CR to the retract solenoid S–206 to the return bus 330. Also from the bus 326 voltage is fed through a closed contact 4CR$_c$ to a terminal 336 on solenoid S–205. This connection is used to light an indicating lamp in the retract position. Valve 205 is a single solenoid operated valve and mechanically returns to the retract position when power is removed from the extend solenoid.

Valve position indicating lamps are not shown in the schematic; except for the retract position of valve 205, they will be understood to parallel respective valve solenoids and one is shown in Figure 45.

Voltage is fed through bus 320 to contact 6CR$_f$ (now closed) and thence to the Air Dump solenoid so designated with a return path to bus 304. The energizing of this solenoid shifts the Air Dump valve to allow air to enter the lines to the control valves 201 through 207.

Summarizing at this point:

Relay 5CR is energized.
Relay 6CR is energized.
Valve retract solenoid 203 is energized.
Valve retract solenoid 204 is energized.
Valve retract solenoid 201 is energized.
Valve retract indicating light is energized.
Valve retract solenoid 206 is energized.
Valve retract solenoid is energized.
The Air Dump valve solenoid is energized.

Appropriate indicating lights on the panel (Figure 45) show the valve solenoids that are energized, show that air pressure is normal, and show that the control panel is in standby condition for automatic operation.

Now, if switch SW–4 ("Automatic Start") is pressed, the automatic cycle is started by allowing current to flow through relay coil 1CR and through pole SW–5B to the return bus 314 with the following effects:

(1) The energizing of relay coil 1CR causes normally closed contact 1CR$_a$ to open de-energizing the indexing arm brake solenoid BK. Also, normally open contact 1CR$_b$ closes to allow current to pass through the clutch solenoid CL through a variable resistance Rv and a fixed resistance R. The magnetic clutch is energized and torque is applied to the index arm to start the machine indexing. The two resistances are used to limit current in the clutch so that the clutch will slip when the torque is excessive.

(2) Energization of relay 1CR also causes a normally open contact 1CR$_c$ to close, allowing current to pass through a closed switch SW–25 through the retract solenoid 202 to the return bus 322. This retracts the cylinder 35 for the bag lifter arm.

(3) As the indexing arm leaves its rest position, the actuator on the arm allows switch pole SW–162B to return to its normal closed position to provide a bypass through a contact 6CR$_7$ for switch SW–4 and switch pole SW–5B. The push button switch SW–4 can now be released and indexing continues because relay 1CR remains energized through SW-162B and contact 6CR$_7$.

(4) Indexing continues and the indexing arm passes over switch SW-160 to momentarily close the switch.

(5) Closure of switch SW-160 allows current to pass from bus 312 through closed contact 6CR$_m$ through coil S (motor M control) through closed switch SW-2 to the return bus 314.

(6) Energizing coil S closes switch poles SW-M$a$ and SW-M$b$ of the timer which remain closed until the cam shaft moves to the 360° position. The closure of pole SW-M$a$ causes current to flow from the bus 312 through a closed contact 7CR$_a$, through previously closed pole SW-6A, through a closed pole SW-10A of a push button switch 10 (on panel) through the timer motor M through pole SW-M$a$ to the return bus 314. The energized timer motor turns the cam shaft of the timer until the 360° position is reached.

(7) Closure of limit switch SW-160 by the indexing arm also allows current to flow from the bus 312 through normally closed switch SW-26, through relay coil 4CR, through normally closed contact 3CR$_a$, through closed contact 4CR$_d$, through closed switch SW-162 to the return bus 314.

(8) Relay 4CR seals itself in through its contact 4CR$_e$ to the return bus 314 through a push button switch switch SW-12.

(9) Contact 4CR$_d$ opens making it possible to de-energize coil S when the switch SW-2 returns to its open position, leaving poles SW-M$a$ and SW-M$b$ in closed condition.

(10) The normally closed contact of 4CR$_a$ is opened, de-energizing the retract solenoid S-207.

(11) A normally open contact 4CR$_f$ closes energizing the extend solenoid S-207. This drives home the latch to detach the indexing arm from the turn-table.

(12) The normally closed contact 4CR$_c$ is opened and a normally open contact of 4CR$_g$ is closed. This energizes the extend solenoid S-205 of valve 205 to start the jolting at the Jolt Station.

(13) The normally open 4CR$_b$ contact is closed. This has no effect at time of closure because at this time pole SW-1B is open to keep power flow from relay coil 2CR to the return bus 314.

Summarizing at this point:

Relay 5CR is energized.
Relay 6CR is energized.
Valve 203 retract solenoid is energized.
Valve 202 retract solenoid is energized.
Valve 204 retract solenoid is energized.
Valve 201 retract solenoid is energized.
Valve 205 solenoid is energized.
Valve 206 retract solenoid is energized.
Valve 207 extend solenoid is energized.
The timer motor has started turning.

The Indexing Arm without the carrier is returning to starting position.

Switch 2 is back to its normal position.
Coil S is de-energized.

As the timer motor turns the cams which actuate timer switches T1-T6, changes take place in the valve solenoids as follows:

(1) Immediately after the 0° position of the shaft, timer switch T1 is actuated opening contact T1-$b$ and closing contact T1-$a$. This de-energizes the retract solenoid of valve 203 and allows current to flow through the extend solenoid to the return bus 322.

(2) Immediately after the 0° position of the shaft, timer switch T5 is opened. This switches voltage from the contact 2CR$_a$ to closed contact 4CR$_b$. Note that though voltage had been available at 2CR$_a$, relay coil 2CR was not energized because of the open pole SW-162B.

(3) At about the 20° position of the timer cam shaft, timer switch T4 is actuated. This open contact T4$_b$ to de-energize the retract solenoids of 201 and 204 and closes contact T4$_a$ to cause current to flow through the extend solenoid 201 to the return bus 322. Current flows through closed contact 6CR$_h$ through the extend solenoid of valve 201 to the return bus 322, energizing the extend solenoid S-201 to shift valve 201.

(4) At about the 40° position of the timer shaft, timer contact T3-$a$ is closed (T3-$b$ is not used in this schematic diagram) to allow current to flow from the energized bus 344 through closed contact 7CR$_b$ through closed switch SW-9 through relay 10CR to the return line 304. Energizing 10CR causes the scale to drop its charge of carbon black. (Relay 10CR is a part of the scale (not shown) which is a unit separate from the Packaging Machine and its controller.)

(5) At about the 60° position of the timer shaft, timer switch T3-$a$ is opened. This de-energizes relay 10CR and the scale (not shown) starts accumulating another charge of carbon black.

The indexing arm has been turning and the arm comes up against switch poles SW-162A and 162-B in the end position of the stroke. This opens up the current path of relay coil 1CR through pole SW-162A, de-energizing relay coil 1CR which has the following effect:

Closes contact 1CR$_a$ to allow D. C. power to flow through the brake coil solenoid BK.

Opens contact 1CR$_b$ to interrupt current flow through the clutch coil CL. The indexing arm comes to rest against the limit switches SW-162A, SW-162B, SW-162A being thus opened and SW-162B closed.

Opens contact 1CR$_c$ to interrupt current flow through the retract solenoid of valve 202. The valve does not shift because the extend position is not energized at this time.

(Switch pole SW-162B has no effect at this time. Its need becomes apparent after the first cycle.)

At about the 180° position of the timer cams, timer switch T2 is actuated. Current now flows through contact T2-$a$ from energized bus 320, through the closed pole $a$ of a double throw switch SW-24, through the extend solenoid of valve 202 to the return bus 322.

At about the 220° position of the timer cams, timer switch contact T4-$a$ is opened to de-energize the extend solenoids S-201 and S-204 and T4-$b$ is closed to energize the retract solenoids.

At about the 240° position of the timer cams, timer contact T1-$a$ is opened to de-energize the extend solenoid S-203 and energize the retract solenoid through closing of contact T1-$b$.

At the same 240° position of the timer cams, timer contact T2-$a$ is opened to de-energize the extend solenoid S-202. Voltage is available up to the now open contact 1CR$_c$, but this contact prevents energizing of the retract solenoid until relay 1CR becomes energized during the indexing period.

Also at about the 240° position of the timer cam, timer contact T5-$a$ is closed. Current can now flow through closed contact 4CR$_b$ and the relay coil 2CR through closed contact 3CR$_b$ of relay 3CR through now closed pole SW-162B to the return bus 314.

The energizing of relay 2CR closes the normally open contact 2CR$_b$. This contact locks in relay 2CR. Normally closed contact 2CR$_a$ is opened to de-energize the retract solenoid of valve 206. Normally open contact 2CR$_c$ is closed to allow current to pass through closed contact 6CR$_j$ and thence through the extend solenoid of valve 206 to the return bus 322.

The energizing of the extend solenoid S-123 causes a sensing device or feeler arm to come down on the carbon black at the jolt station. The feeler arm in leaving its retracted position opens a limit switch SW-130', normally closed. This opening of switch SW-130' at this time is important in the sequence of events to follow.

The feeler arm continues to ride on the top of the carbon black as the jolting continues until such time as the height and density of the carbon black in the bag approaches the desired point.

In the meantime, the timer cams have reached the 360° position. A cam (not shown) which will be understood to be on the timer motor shaft opens SW–M$a$ and closes SW–$b$, and stops the motor M. A mechanical catch (not shown) prevents coasting of the cam shaft so that the cam shaft always comes to rest at the 360° position. Thus SW–M$a$ and SW–M$b$ are operated in one direction by coil S, and in the opposite direction by motor M at the end of a cycle.

Summarizing at this point:

Relay 4CR is energized.
The timer drive motor M is de-energized.
Valve 203 is in the retract position.
Valve 202 is in the extend position (de-energized).
Valve 204 is in the retract position.
Valve 201 is in the retract position.
Valve 205 is in the extend position.
Valve 206 is in the extend position.
Valve 207 is in the extend position.

The feeler arm continues to ride the top of the carbon black until at a predetermined height and density the feeler arm comes in contact with and actuates a switch SW–130. This allows current to flow through relay coil 3CR.

Energized relay 3CR is locked in through contact 3CR$_c$ and through closed pole SW–162B.

The normally closed contact 3CR$_a$ is now open to de-energize relay coil 4CR.

De-energizing of relay 4CR has the following effects:

(1) Opens 4CR$_g$ contact to de-energize the extend solenoid S–205.

(2) Opens 4CR$_f$ contact to de-energize the extend solenoid S–207.

(3) Closes normally closed 4CR$_a$ contact to allow current flow through the retract solenoid S–207.

The normally closed contact 3CR$_f$ is now open and this de-energizes relay coil 2CR.

De-energizing of relay coil 2CR has the following effects:

(1) Opens its contact 2CR$_b$.

(2) Opens contact 2CR$_a$ to de-energize the extend solenoid S–206.

(3) Closes contact 2CR$_a$ to allow current to flow through retract solenoid S–206.

The shift of valve 206 causes the feeler arm to rise. This opens switch SW–130 and closes SW–130' which effects a current path through relay coil 1CR and closed contact 3CR$_d$ through closed pole SW–5B to the return bus 314.

Energizing of relay coil 1CR energizes the clutch solenoid CL and de-energizes the brake solenoid BK as previously described.

Summarizing at this point:

Relay coil 1CR is energized.
Relay coil 3CR is energized.
Indexing has started.

Operating movement of the indexing arm closes pole SW–162A and opens pole SW–162B. Thus, an alternate current path is provided through relay coil 1CR through closed contact 6CR through closed pole SW–162A to the return bus. The opening of the SW–162B de-energizes relay coil 3CR.

All 3CR contacts now return to normal; contact 3CR$_d$ is now open so that the only current path through 1CR coil is through pole SW–162A although SW–130' is closed.

The indexing arm continues to move and as before momentarily opens switch SW–160.

The automatic cycle repeats as described above.

As described above, the feeler arm closed switch SW–130 after the timer cam shaft reached its 360° position. This did not have to be the case as the feeler arm could close this switch immediately after it comes down at about 240° on the timer cam shaft. In this case, indexing would start in the same manner as previously described, but the cam shaft would move to its 360° position during the indexing time. The time of a complete time cycle is adjustable by choosing a gear train to use with the timer drive motor. The cam setting determines the time the feeler arm comes down and could be so adjusted that under any condition the timer would complete its cycle before being recycled by the closing of switch SW–160 during the indexing.

DETAILED DESCRIPTION OF NORMAL STOP

Assume machine is operating automatically and is to be brought to a stop at the end of a cycle.

Toggle switch SW–5 is thrown to the Normal Stop or open position, thus opening poles SW–5A, SW–5B, SW–5C, as shown on the diagram.

The machine continues to operate (no matter at what time in the cycle the switch is thrown) until it is time for indexing, and the indexing would normally start because of a current path through relay coil 1CR through closed switch SW–130' and through closed relay contact 3CR$_d$ through pole SW–5B. However, because pole SW–5B is open, current cannot flow and operation stops at the point where the indexing would normally begin.

Pole SW–5A, when open, prevents relay 3CR from locking itself in so that the relay will be de-energized at the time the machine comes to a normal stop.

DETAILED EMERGENCY STOP OPERATION

At any time during the automatic cycle the machine may be brought to an emergency stop by throwing switch poles SW–6A, SW–6B to Emergency Stop or open position, this to interrupt the current through relay coil 6CR.

De-energizing relay 6CR removes the voltage from the timer switch by opening contacts 6CR$_a$ through 6CR$_e$.

De-energizing relay 6CR de-energizes the Air Dump valve solenoid by opening contact 6CR$_f$ to shut off the air from the supply and dumps the air existing in the lines at the machine.

De-energizing relay 6CR opens contact 6CR to de-energize relay 1CR which thus energizes the indexing arm brake solenoid BK and de-energizes the indexing arm clutch solenoid CL. This can occur only if poles SW–6A, SW–6B, SW–6C are opened during the indexing period.

De-energizing relay 6CR opens contact 6CR$_j$ to remove voltage from a portion of bus 326. Contacts 6CR$_g$, 6CR$_h$ and 6CR$_i$ are contacts useful to Manual operation in the isolation of solenoid valves for testing the machine on non-automatic operation.

Throwing poles SW–6A and B to the the Emergency Stop position also removes power to the timer drive motor M.

It should be noted that except for relay 1CR all relays that happened to be energized at the time poles SW–6A and B are opened remain energized. If 1CR happened to be energized and it was de-energized by the opening of contact 6CR, it would return to an energized condition by closure of poles SW–6A and SW–6B to the Run position, thus closing relay contact 6CR at the time relay 6CR becomes energized.

Accordingly, returning these poles to the run position energizes relay 6CR and starts the machine operating at the point where it was stopped.

DETAILED DESCRIPTION OF "NO BAG" ACTION

At the point in the automatic cycle just before the scale is ready to drop its charge of carbon black, a vacuum sensing device (not shown) is used to determine whether a bag is correctly placed in the carrier at the Fill Station. If the vacuum is correct at this particular time in the cycle, the vacuum switch contacts 350 are open and the cycle continues without interruption. The vacuum switch is operated by the vacuum sensing device.

However, should a bag be missing or twisted so that a vacuum cannot be maintained, then contacts 350 would close. This would give a current path from the energized bus 312 through a push button panel switch SW-23, through pole SW-6B through switch T6 of the timer, through relay coil of 7CR to the return bus 314.

Energization of relay 7CR has the following effect:
(1) Opens contact 7CR$_b$ to prevent the scale from dumping.
(2) Closes contact 7CR$_c$ to allow current to flow from point through the alarm indicating device A.
(3) Closes contact 7CR$_d$ to lock in relay 7CR; contact 7CR$_d$ by-passes vacuum switch 350.
(4) Opens contact 7CR$_a$ to de-energize relay 6CR.

De-energizing relay 6CR brings all operations to an emergency stop as hereinabove described, as obtained when operating the Emergency Stop switch.

The alarm A will be understood to have a noise element so that the operator will shut it off before correcting the bag discrepancy. The Emergency Stop switch SW-6 can be thrown to open position to shut off the "no bag alarm" A.

The bag discrepancy is corrected with the machine in the Emergency Stop condition, so that a chance momentary power failure would not de-energize relay 7CR and the return of power find the vacuum correct which would restart the machine at the point in the cycle where it stopped. Actually, the fact that 7CR locks itself in once it is energized is a safety factor against practically all contingencies since the operator must use the Emergency Stop switch SW-6 before the machine can be restored to normal operation.

The function of the timer switch T6 is to make it possible for relay 7CR to be energized only during a limited portion of the cycle. Current cannot flow through the relay coil unless timer switch T6 is actuated closing contact T6-a. This limits the vacuum sensing period to a definite time in the cycle. Correct vacuum cannot be maintained during indexing and it is necessary to sense the vacuum just before time to drop the charge of carbon black.

DETAILED INFORMATION ON SPECIAL FEATURES

1. Operation of scale hold switch

With the machine in automatic operation, switch SW-9 is used to hold the charge of carbon black. Opening this switch allows the machine to continue running without carbon black being dropped. Also, the switch interrupts the current path from the timer switch T3 through a scale control relay 10CR.

Switch SW-9 is useful in setting the machine in initial operation since a bag would not otherwise be in the carrier at the Fill Station until the machine had indexed once.

2. Operation of vacuum sense by-pass switch

Switch SW-23, a normally closed push button switch, can be used to open the current path through relay 7CR in the vacuum sensing circuit. Pressing switch SW-23 prevents relay 7CR from becoming energized during the sensing period.

The switch is useful in setting the machine in initial operation in preventing the machine from coming to an emergency stop on the initial start before a bag becomes available at the Fill Station.

The switch SW-23 should be used in conjunction with the switch SW-9.

3. Operation of jolt by-pass switch

If for any reason (such as an initial start) a bag reaches the Jolt Station without a load of carbon black, it may be desirous to by-pass the jolting action for that part of the cycle. Pressing switch SW-22 opens the current path to the extend solenoid of valve 205. This prevents jolting from taking place.

4. Shift to manual operation

Switch SW-11 having normally open pole SW-11A and normally closed pole SW-11B is used to shift the control panel to manual operation. Closing pole SW-11A provides a current path through relay coil 8CR through contact 1CR$_d$ and through pole SW-M$b$. This is a safety feature because the relay 8CR cannot be energized with indexing underway (1CR relay energized) or with the timer in other than the 0° position because pole SW-M$b$ would be open.

Energizing 8CR relay opens contact 8CR$_a$ and this in turn de-energizes relay 6CR. Contacts of 6CR isolate various portions of the circuit to permit manual operation. Closure of contact 8CR$_b$ feeds voltage to the manual bus 354 used to separately energize valve solenoids. Closure of contact 8CR$_c$ locks in relay 8CR through a closed switch SW-12.

Pole SW-11B is necessary to prevent feedback during the transition from automatic to manual control.

Energizing the manual bus 354 energizes relay 9CR through closed pole SW-5B. Six normally open contacts 9CR$_{a-f}$ of relay 9CR prevent feedback from the manual bus during automatic operation.

5. Shift from manual to automatic operation

Switch SW-12 is pressed to switch from manual to automatic operation. Note that the closed pole SW-5C by-passes switch SW-12 to the return bus 314. Unless pole SW-5C is in open or Normal Stop position, closing switch 12 has no effect on the circuit.

With pole SW-5C open, opening switch 12 breaks the current path through relay 8CR and thus de-energizes relay 8CR which returns the control panel to the condition for automatic operation.

The fact that pole SW-5C must be open to permit this shift is a safety feature to prevent the machine from starting automatic operation until switch SW-4 is pressed.

6. Manual features

Switches SW-13 through SW-18, SW-24 and SW-25 are a part of the manual control primarily useful to the technician for adjustment and servicing for independently energizing solenoids with which they are associated in the circuit diagram.

It will be obvious to those skilled in the art that various changes may be made without departing from the spirit of the invention and therefore the invention is not limited to what is shown in the drawings and described in the specification but only as indicated in the appended claims.

We claim:
1. A machine for packaging fluent materials into bag like containers comprising a plurality of fixed stations including a bag opening and a bag filling station, a turntable movable from station to station and means for driving said turntable, a bag carrier for each station seated on said turntable, means for supporting a bag in opened position in said carrier, a movable discharge hopper positioned over the open end of said bag at said filling station, an expansible sealing means fixed about said hopper, means to expand said sealing means into contact with the inside walls of the bag to close the open end thereof against the atmosphere and dust chimneys connecting said bag with said hopper to return to said hopper the dust raised by said fluent materials when a charge is dumped into the bag.

2. In a packaging machine having a plurality of stations, a turntable having carrier supporting arms for each station, an open ended carrier supported by said arms at at least one station, and end walls for said carrier at said station to close and open said open ends of said carrier when the carrier is positioned at said station.

3. A machine according to claim 2 in which means for closing said end wall are provided at said station, the movement of the carrier into position at said station energizing said means to close the open side of said carrier.

4. A machine according to claim 2, said machine having a frame, said end walls being pivoted to said frame and swingable into position against the open ends of said carrier.

5. A machine according to claim 2 in which said carrier has side walls with flanges thereon extending along said open ends with openings spaced along the length of said flanges and said end walls have aligning pins adapted to enter said openings when said walls are moved to close said open ends.

6. A machine according to claim 2 in which said carrier has side walls and a bottom, said side walls being inclined to the vertical with respect to said bottom, flanges on said side walls at the ends thereof with openings spaced along the length of said flanges, and substantially vertically arranged aligning pins on said end walls adapted to enter said holes and pull the side walls of the carrier into substantially vertical position with respect to said bottom when the end walls are closed.

7. In a packaging machine having a plurality of stations, a turntable having carrier supporting arms for each station, an open ended bag carrier supported by said arms at at least one station, end walls for said carrier at said station to close said open sides of said carrier when the carrier moves to said station, said carrier having suction manifolds for supporting the walls of a bag in open position in said carrier by suction applied to said bags and means for applying suction to said manifold.

8. In a packaging machine of the rotary turntable type, a bracket on said turntable, a pair of spaced arms on said bracket and a carrier removably supported on said bracket between said arms, said carrier havng side walls and a bottom, an air manifold on each side wall and an air conduit connected to each manifold, a conduit extending from each arm to said manifold, said conduits being telescopically connected.

9. In a packaging machine having a plurality of stations, a turntable having carrier supporting arms for each station, an open ended carrier supported by said arms at at least one station, end walls for said carrier at at least two stations and means at each of said latter stations for closing and opening said end walls with respect to said carrier.

10. A packaging machine according to claim 9 in which control means are provided and synchronized with the rotation of said turntable, said control means being actuated to close said end walls when the carrier moves into position at one of said latter stations, said control means being actuated after an operating interval to open said end walls just prior to the movement of said carrier from said station.

11. In a packaging machine having a plurality of stations, a turntable, a carrier on said turntable for supporting a bag at each station, drive means for rotating said carrier periodically from station to station, control means for automatically interrupting said drive means to stop said carrier at a station for a predetermined period, and means for again actuating said drive means at the end of said period.

12. In a packaging machine, a bag carrier having side walls and a base, said side walls converging from top to bottom towards said base, end walls for said carrier on said machine, said walls being movable towards said carrier to close the open ends thereof, and cooperating means on said side and end walls pulling said side walls together in substantial parallelism when said end walls are applied to said carrier.

13. In a packaging machine including a bag opening and a bag filling station, a turntable rotatable from station to station, a carrier on said turntable for supporting a bag at each station, means on said carrier for applying suction to the walls of the bag to maintain it in open position in the carrier at the bag filling station, supply means on said turntable for supplying suction to said carrier at said station and during its movement to the next station, and means for automatically shutting off said suction after the carrier reaches said second station and restoring said suction to said first station.

14. A machine according to claim 13 in which said last named means comprises an oscillating plate on said turntable, latching means to latch said plate to said turntable, suction conduit secured to said plate and turntable which are in alignment to supply suction to said carrier and bag when the plate and turntable are latched together, said suction conduit being moved out of alignment, shutting off suction to the carrier when the plate and turntable are unlatched.

15. In a packaging machine, means for lifting a folded bag from a stack, opening it and positioning it in said machine, comprising a magazine for supporting a stack of folded bags, a chute adjacent said magazine, a suction head supported for movement from said magazine to said chute, means for applying suction to said head, means to move said head into contact with a folded bag in said magazine and to lift said folded bag into position over said chute, means to open said bag in said chute and means to move said bag down said chute after it has been opened therein.

16. A machine according to claim 15 in which the means for opening said bag comprises an air nozzle positioned adjacent the mouth of the bag for applying air under pressure at the mouth of the bag.

17. A machine according to claim 15 in which the horizontal cross sectional area of the chute is substantially equal to the horizontal cross sectional area of the bag when it is opened, and said last named means comprising suction applied to the bottom of the opened bag to draw it down the chute.

18. A machine according to claim 15 in which the support for the suction head comprises a swingable conduit, said conduit connecting said head with its suction source.

19. In a packaging machine, means for lifting a folded bag from a stack, opening it and positioning it in said machine, comprising a magazine for supporting a stack of folded bags, a chute adjacent said magazine, a suction head supported for movement from said magazine to said chute, means for applying suction to said head, means to move said head into contact with one side of a folded bag in said magazine and to lift said folded bag into position over said chute, means for creating a low pressure area along the other side of the bag adjacent its mouth to open same, and means to move said bag down said chute after it has been opened therein.

20. A machine according to claim 19 in which said last named means comprises a nozzle blowing air into the opened mouth of the bag, and suction applied to the bottom of the bag.

21. A machine according to claim 19 in which the low pressure area creating means comprises a nozzle positioned above the mouth of the closed bag as it is supported by said suction head, said nozzle being offset from the mouth of the bag.

22. A machine according to claim 19 in which the low pressure area creating means also blows air into the mouth of the bag after it has opened.

23. A machine according to claim 19 in which said low pressure area creating means is also one of the last named means to move said bag down said chute.

24. In a packaging machine having a plurality of stations, in combination, a turntable rotatable from station to station, bag carriers supported on said turntable, a chute positioned over said turntable at the first station in the path of said carriers as they rotate from station to station, means for lifting a carrier into air tight contact with the bottom of said chute, means for supplying a folded sack-like container to the open end of said chute, means for opening said container in said chute, means for moving said opened container down said chute into said carrier and supporting it in opened position therein, means for moving said carrier to the next station, and means for maintaining the bag in opened position during such movement.

25. In a bag packaging machine having a plurality of stations; a bag opening station; a bag magazine; a chute at said bag opening station adjacent said magazine, a bag carrier positioned below said chute, said carrier having side walls and a base; end walls at said station to close the ends of said carrier, said side and end walls being movable into contact with the open bottom of said chute, means for lifting a folded bag from said magazine and moving it into said chute; means for opening said bag in said chute, means for pulling said opened bag from said chute into said carrier and means for maintaining said bag open within said bag carrier.

26. In a bag packaging machine having a plurality of stations, a bag opening station, a bag magazine, a chute at said station adjacent said magazine, a bag carrier positioned below said chute said carrier having side walls and a base; end walls at said station to close said carrier, said side and end walls being movable into sealing contact with the open bottom of said chute; means for lifting a folded bag from said magazine and moving it into said chute, suction means for pulling said bag into said carrier from said chute and suction means for maintaining said bag open within said carrier.

27. A machine according to claim 26 in which said base has a sub-base, an air opening in the bottom of said sub-base, a suction head below said sub-base and movable into sealing contact with said opening, air passages in said sub-base leading from said opening to the side walls of said carrier, whereby suction may be applied along the side walls of said carrier.

28. In a machine for packaging materials having a low energy transfer characteristic, means for lowering the level of such material in a bag to a predetermined point in the bag by subjecting said material to a series of severe jolts, a cut-off means on said machine for interrupting the jolting when the desired level of material has been reached in the bag, and means for sensing the level of such material in the bag during such jolting, said sensing means being operative to actuate said cut-off means when the desired level has been reached.

29. A machine for packaging fluent, powdery or pelletized materials comprising a turntable and means for driving same, a plurality of stations radially disposed about said turntable, said turntable being rotatable from station to station; a bag carrier supported on said turntable for each station; means for opening a bag and supporting it in said carrier at a first station; means for guiding a charge of material into said opened bag at a second station and means for jogging said bag and carrier at said second station to settle the contents thereof at said station; means for severely jolting said carrier at a third station to compact the bag contents to a predetermined level in the bag; means for discharging the compacted bag at a fourth station, said bag carrier having side walls and a bottom, the side walls and bottom resting on said turntable, end walls for said carrier, said end walls being positioned at at least one station, said end walls being movable into position against the carrier to close the ends thereof when the carrier moves into position in said station.

30. A machine for packaging fluent, powdery or pelletized materials comprising a turntable and means for driving same, a plurality of stations radially disposed about said turntable, said turntable being rotatable from station to station; a bag carrier supported on said turntable for each station; means for opening a bag and supporting it in said carrier at a first station; means for guiding a charge of material into said opened bag at a second station and means for jogging said bag and carrier at said second station to settle the contents thereof at said station; means for severely jolting said carrier at a third station to compact the bag contents to a predetermined level in the bag; means for discharging the compacted bag at a fourth station, said bag carrier having side walls and a bottom, end walls for said carrier, said end walls being permanently positioned at the jogging and jolting stations, with means provided at said stations for giving dynamic support to said end walls during the jogging and jolting cycles.

31. A machine for packaging fluent, powdery or pelletized materials comprising a turntable and means for driving same, a plurality of stations radially disposed about said turntable, said turntable being rotatable from station to station; a bag carrier supported on said turntable for each station; means for opening a bag and supporting it in said carrier at a first station; means for guiding a charge of material into said opened bag at a second station and means for jogging said bag and carrier at said second station to settle the contents thereof at said station; means for severely jolting said carrier at a third station to compact the bag contents to a predetermined level in the bag, means for discharging the compacted bag at a fourth station, and means provided at the third station for sensing when the predetermined level of the contents in the bag has been reached, said means acting to stop the jolting mechanism when such level has been reached.

32. A machine for packaging fluent material into baglike containers, comprising a plurality of fixed stations including a bag opening and bag filling station, a turntable movable from station to station and means for driving said turntable, a bag carrier for each station seated on said turntable, means for supporting a bag in opened position in said carrier, means at said bag filling station for guiding a charge of fluent material into said bag, means for temporarily closing the open end of said bag around said guiding means while a charge of fluent material is dumped into the bag, a movable discharge hopper positioned over the open end of the bag at said bag filling station, an expansible sealing means fixed about said hopper, means for lowering said hopper into an open bag at said station, and means to expand said sealing means into contact with the inside walls of said bag to close the open end thereof against the atmosphere.

References Cited in the file of this patent

UNITED STATES PATENTS

| | | |
|---|---|---|
| 505,888 | Smyser | Oct. 3, 1893 |
| 1,446,256 | Lane et al. | Feb. 20, 1923 |
| 2,069,266 | Nicodemus | Feb. 2, 1937 |
| 2,282,199 | Neuman | May 5, 1942 |
| 2,350,666 | Allen | June 6, 1944 |
| 2,432,373 | Bleam et al. | Dec. 9, 1947 |
| 2,521,211 | Ganz | Sept. 5, 1950 |
| 2,532,871 | Wagner | Dec. 5, 1950 |
| 2,560,475 | Rehnberg et al. | July 10, 1951 |
| 2,655,301 | Riemer | Oct. 13, 1953 |
| 2,684,191 | Dolman | July 20, 1954 |
| 2,691,476 | Petrea | Oct. 12, 1954 |
| 2,692,353 | Mason et al. | Oct. 19, 1954 |
| 2,697,543 | Sawyer et al. | Dec. 21, 1954 |
| 2,717,977 | Decker | Sept. 13, 1955 |